(12) United States Patent
Kasper et al.

(10) Patent No.: US 6,286,180 B1
(45) Date of Patent: Sep. 11, 2001

(54) UPRIGHT WATER EXTRACTION CLEANING MACHINE PUMP PRIMING

(75) Inventors: Gary Kasper, Grand Rapids; Eric C. Huffman, Lowell; Gary L. Smith, Belding; Timothy E. Kasen, Jenison; Luke E. Kelly, Kentwood; Charles A. Reed, Rockford, all of MI (US)

(73) Assignee: Bissell Homecare, Inc., Grand Rapids, MI (US)

( * ) Notice: Subject to any disclaimer, the term of this patent is extended or adjusted under 35 U.S.C. 154(b) by 0 days.

(21) Appl. No.: 09/535,850

(22) Filed: Mar. 27, 2000

Related U.S. Application Data

(63) Continuation-in-part of application No. 09/112,527, filed on Jul. 8, 1998, which is a continuation-in-part of application No. 09/009,155, filed on Jan. 20, 1998, now Pat. No. 6,041,472, which is a continuation-in-part of application No. 08/741,746, filed on Nov. 5, 1996, now Pat. No. 5,896,617.
(60) Provisional application No. 60/007,289, filed on Nov. 6, 1995, provisional application No. 60/006,665, filed on Nov. 13, 1995, provisional application No. 60/017,175, filed on May 9, 1996, provisional application No. 60/026,988, filed on Sep. 20, 1996, provisional application No. 60/075,924, filed on Feb. 25, 1998, and provisional application No. 60/052,021, filed on Jul. 9, 1997.

(51) Int. Cl.[7] ....................................................... A47L 7/00
(52) U.S. Cl. ............................................................... 15/320
(58) Field of Search ........................................ 15/320, 321

(56) References Cited

U.S. PATENT DOCUMENTS

| | | |
|---|---|---|
| 4,329,756 * | 5/1982 | Chicoine et al. ..................... 15/321 |
| 4,809,397 | 3/1989 | Jacobs et al. . |
| 4,940,397 | 7/1990 | Kuhlen . |
| 4,956,891 | 9/1990 | Wulff . |
| 5,287,590 * | 2/1994 | Yonkers et al. ...................... 15/321 |
| 5,289,610 * | 3/1994 | Monson ................................ 15/320 |
| 5,850,668 * | 12/1998 | Berfield et al. ...................... 15/353 |

\* cited by examiner

*Primary Examiner*—Chris K. Moore
(74) *Attorney, Agent, or Firm*—Rader, Fishman, Grauer, & MC Garry,

(57) ABSTRACT

A portable surface cleaning apparatus has a base for movement along a surface to be cleaned and an upright handle pivotally attached to a rearward portion of the base. A fluid dispensing nozzle for applying fluid to the surface and a suction nozzle for picking up fluid and debris from the surface are associated with the base. A clean water holding tank and a detergent holding tank are removably mounted to the handle while a recovery tank is removably mounted to the base. A mixing valve is fluidly connected between the holding tanks and the spray nozzle for changing the mixing ratio of the detergent with respect to the water. The fluid recovery tank includes an integrally molded conduit that extends from the suction nozzle and a mounting for an accessory hose that interrupts the fluid path from the suction nozzle in the conduit and redirects fluid flow through the hose. A pump is fluidly connected between the mixing valve and the dispensing nozzle and includes a pump priming valve that operates on negative air pressure to clear air from the fluid lines during pump operation. A free floating brush is pivotally attached to the base for automatically adjusting to different surface conditions during cleaning operations.

33 Claims, 17 Drawing Sheets

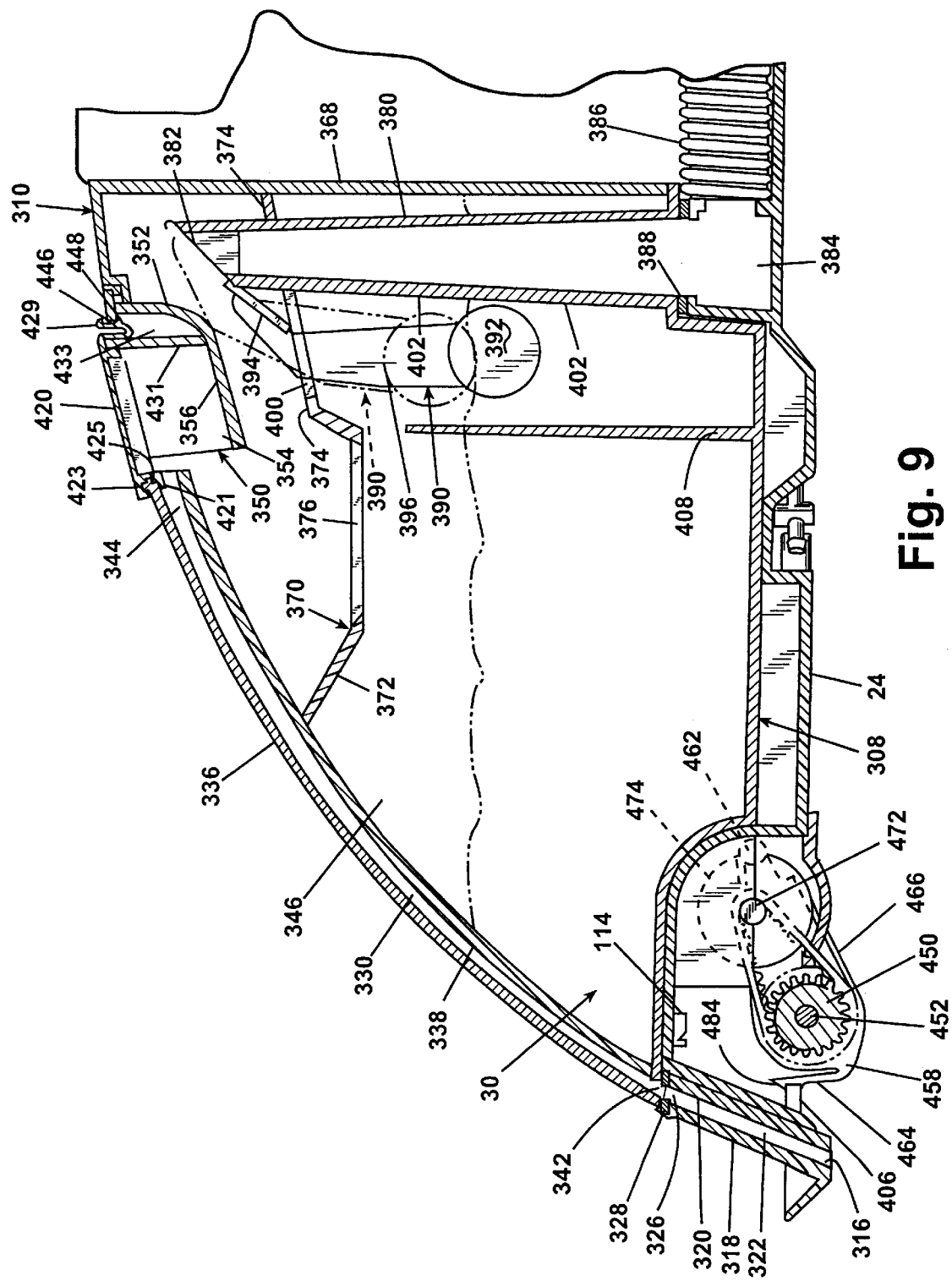

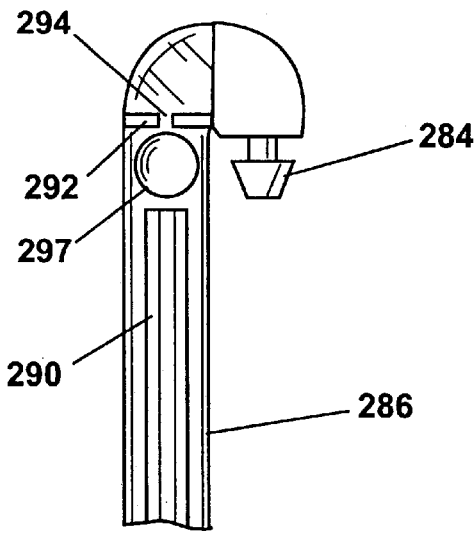
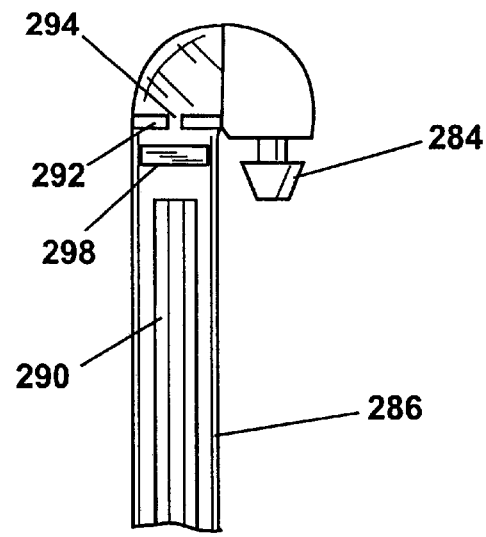
Fig. 19          Fig. 20
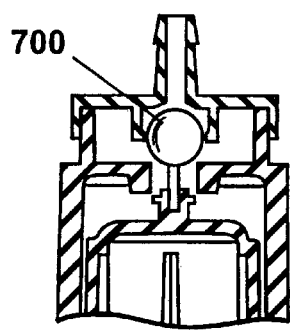
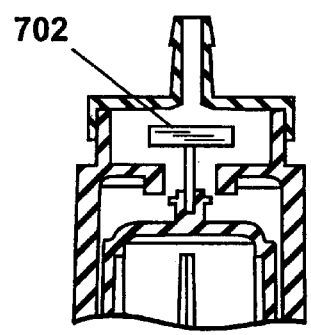
Fig. 21          Fig. 22

UPRIGHT WATER EXTRACTION CLEANING MACHINE PUMP PRIMING

CROSS-REFERENCE TO RELATED APPLICATIONS

This application is a continuation-in-part of U.S. patent application Ser. No. 09/009,155 filed on Jan. 20, 1998, pending, which is a continuation-in-part of U.S. patent application Ser. No. 08/741,746 filed on Nov. 5, 1996, now U.S. Pat. No. 5,896,617, which claims the benefit of U.S. Provisional Application Nos. 60/007,289 filed on Nov. 6, 1995; 60/006,665 filed on Nov. 13, 1995; 60/017,175 filed on May 9, 1996; and 60/026,988 filed on Sep. 20, 1996. This application is also a continuation-in-part of U.S. Patent Application Ser. No. 09/112,527 filed Jul. 8, 1998, pending, which claims the benefit of U.S. Provisional Application Serial No. 60/075,924, filed on Feb. 25, 1998, and U.S. Provisional Application Serial No. 60/052,021, filed on Jul. 9, 1997.

BACKGROUND OF THE INVENTION

1. Field of the Invention

This invention relates to cleaning machines and, more particularly, to an upright water extraction cleaning machine.

2. Description of the Related Art

Water extraction cleaning machines have long been used for removing dirt from surfaces such as carpeting, upholstery, drapes, and the like. The known water extraction cleaning machines can be in the form of a canister-type unit as disclosed in U.S. Pat. No. 5,237,720 to Blase et al. or an upright unit as disclosed in U.S. Pat. No. 5,500,977 to McAllise et al. and U.S. Pat. No. 4,559,665 to Fitzwater.

The current water extraction cleaners can be difficult to use and often have limited adaptability for a variety of cleaning conditions. For example, none of the known water extraction cleaners can quickly and efficiently vary the mixture ratio of detergent and water. In addition, none of the known upright water extraction cleaners can automatically adjust the height of the roller-type agitation brush in response to changes on the surface being cleaned. Another problem inherent with the known water extraction cleaners is ease of use in filling and emptying the clean water tank and recovery tank. Finally, none of the known prior art water extraction cleaners can quickly and easily convert between on-the-floor cleaning and off-the-floor cleaning with an accessory hose and cleaning tool.

SUMMARY OF THE INVENTION

According to the invention, an improved upright water extraction cleaning machine comprises a base adapted for movement across a supporting surface, a handle pivotally mounted to the base, a fluid pump having a fluid inlet connected to at least one liquid holding tank and a fluid outlet connected to at least one spray nozzle to thereby transfer liquid from the at least one holding tank to the at least one spray nozzle under pressure and distribute the liquid onto the supporting surface, a suction nozzle mounted to the base to remove liquid and debris from the surface, and a vacuum source mounted to one of the base and the handle and connected to the suction nozzle to generate a working air flow for recovering the liquid and debris. A priming valve having a valve body with an interior chamber includes a valve inlet port connected to the pump outlet and a valve outlet port connected to the vacuum source. A valve element is located within the interior chamber and is movable between a priming position wherein the valve element is spaced from the valve outlet such that liquid can be drawn into the interior of the hollow body when the vacuum source is operating, and a sealing position wherein the valve element seats against the valve outlet port to block liquid from entering the vacuum source.

In still another embodiment of the invention, a fluid supply conduit in the liquid dispensing system includes a pump fluidly connected to the fluid supply chamber and to the dispensing nozzle for supplying cleaning fluid to the dispensing nozzle. A pump primer is connected to the pump for priming the pump and includes a valved opening connected to the vacuum source. According to the invention, the pump primer includes a housing defining a priming chamber with an inlet opening connected to the fluid supply chamber and an outlet opening connected to an inlet for the pump. In a preferred embodiment of the invention, the valved opening is in an upper portion of the priming chamber. Further, the pump primer includes a valve chamber and a plunger chamber. The valve chamber has an inlet opening defined by the valved opening in the primer chamber and an outlet opening defining an inlet opening to the plunger chamber. The plunger chamber has an outlet opening in fluid communication with the vacuum source. A buoyant plunger is reciprocally mounted in the plunger chamber for generally vertical movement therein. A valve is mounted in the valve chamber and reciprocally movable between the inlet opening and the outlet opening thereof and connected to the plunger for movement therewith. By this structure, the valve closes the outlet opening to the valve chamber when fluid in the plunger chamber raises the plunger and the valve closes the inlet opening when fluid in the plunger chamber falls to a predetermined level. In a preferred embodiment of the invention, the valve in the valve chamber is an umbrella valve.

Preferably, the weight and dimension of the valve element is chosen such that the combined presence of negative air pressure on the valve element and movement of liquid in the interior chamber toward the valve outlet is sufficient to move the valve element toward the valve outlet.

BRIEF DESCRIPTION OF THE DRAWINGS

The invention will now be described with reference to the drawings in which:

FIG. 9 is a partial, sectional view of the foot member and recovery tank taken along lines 9—9 of FIG. 1;

FIG. 19 is a cross-sectional view of a portion of the priming valve of FIG. 4 illustrating an alternative valve plug;

FIG. 20 is a cross-sectional view of a portion of the priming valve of FIG. 4 illustrating an alternative valve plug;

FIG. 21 is a cross-sectional view of a portion of the pump priming assembly of FIG. 18 illustrating an alternative valve plug; and FIG. 22 is a cross-sectional view of a portion of the pump priming assembly of FIG. 18 illustrating an alternative valve plug.

DETAILED DESCRIPTION OF THE PREFERRED EMBODIMENTS

Figure 1:
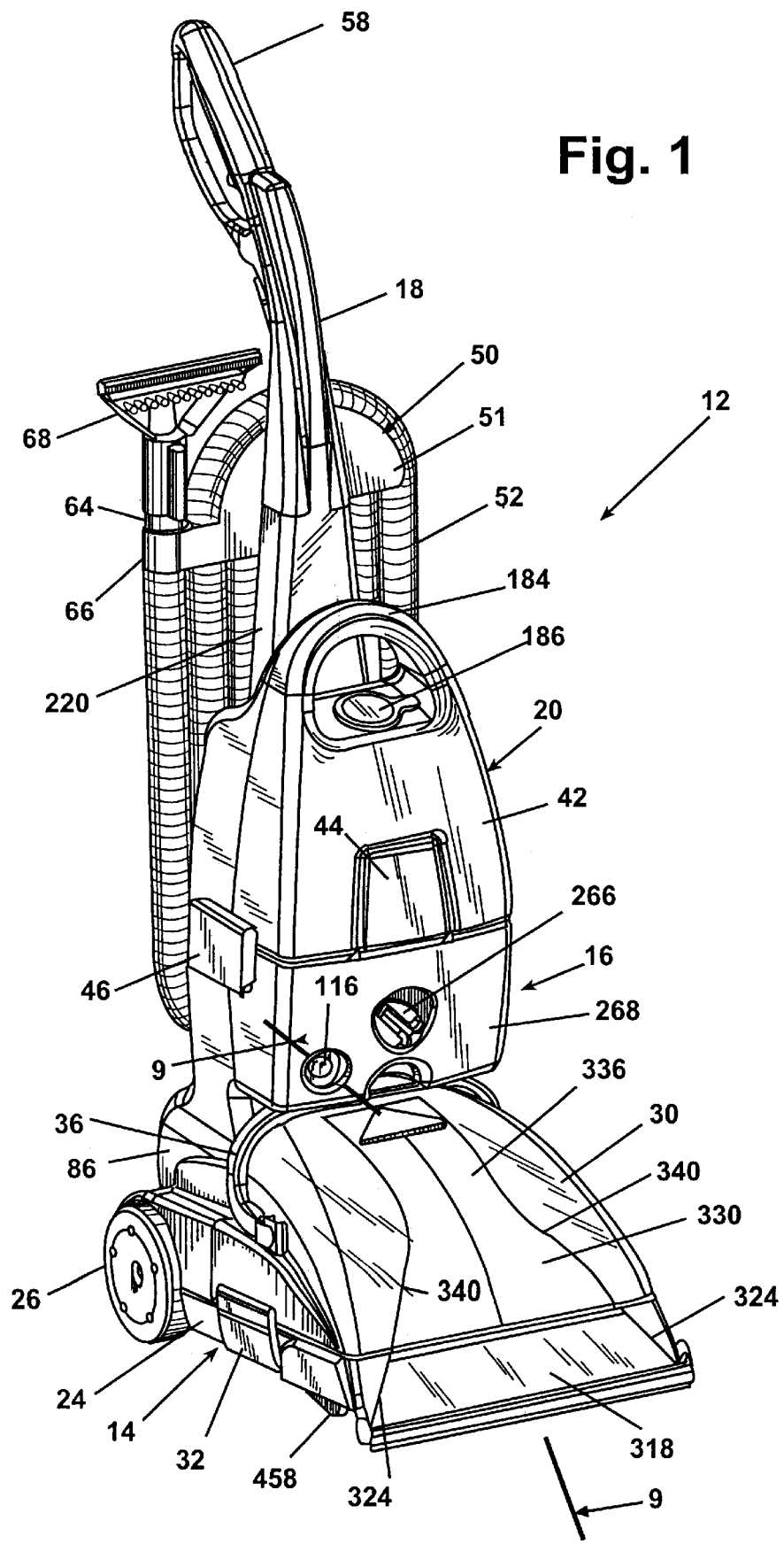
FIG. 1 is a front, perspective view of an upright water extraction cleaning machine according to the invention.
Figure 2:
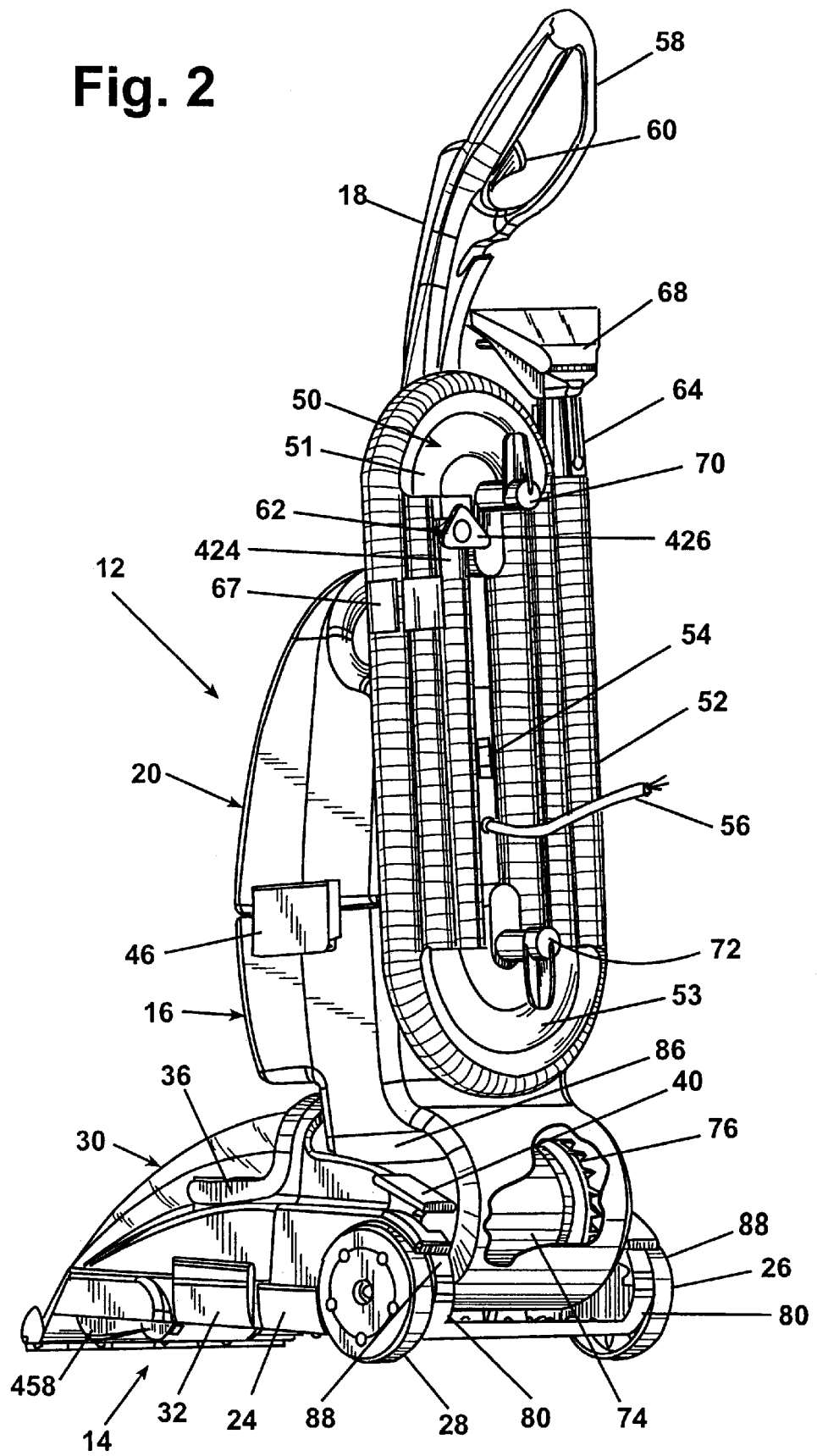
FIG. 2 is a rear, perspective view of the upright water extraction cleaning machine of FIG. 1.

Referring now to the drawings and to FIGS. 1 and 2, in particular, an uptight water extraction cleaning machine 12 is shown which comprises a base assembly 14, an upper housing 16 pivotally mounted to the base assembly 14, a handle 18 extending upwardly from the upper housing 16, and a tank assembly 20 mounted to and supported by both the handle 18 and upper housing 16.

The base assembly 14 comprises a foot or base member 24, a pair of rear wheels 26, 28 mounted to the rear of the foot member 24, and a recovery tank 30 removably supported on the foot member 24. A pair of over-center latches 32 are provided, one on each side of the foot member 24, and are adapted to cooperate with a pair of projections 34 (FIG. 10), one provided on each side of the recovery tank sidewall for locking the recovery tank 30 to the foot member 24. A handle 36 is pivotally mounted to the recovery tank 30 for carrying the tank.

As described further below, the tank assembly 20 comprises a clean water tank 42 and a detergent tank 44 which nests inside the front surface of the clean water tank 42. A pair of over-center latches 46 are provided, one on each side of the sidewall of the upper housing 16. The latches 46 are adapted to cooperate with a pair of projections 48 (FIG. 5), one of which is provided on each of the sidewalls of the clean water tank 42, for locking the tank assembly 20 to the upper housing 16 and handle 18.

An accessory hose storage rack 50 is mounted to the rear surfaces of the handle 18 and upper housing 16. The rack 50 includes an upper portion 51 and a lower portion 53 and is adapted to support and store an accessory hose 52 when the hose is not in use. An accessory hose mounting member 62 is mounted on one end of the hose 52 and is received in a C-shaped clip 66 provided on the upper end of the rack 50. The flexible body of the hose 52 is wrapped around the upper and lower portions 51, 53 of the storage rack 50. A grip tube 64 is mounted on the other end of the hose 52 and is snapped into the C-shaped clip 66 integrally molded into the rack 50. In this position, the entire length of the accessory hose 52 is supported on the rack 50 and is easily transported with and stored on the cleaning machine 12. Preferably, the accessory hose 52 remains on the rack at all times, except when the hose 52 is in use. A double C-shaped clip 67 (FIG. 2) can be provided at one or more locations to clamp adjacent portions of the hose 52 together when the hose is stored on the machine. The double C-shaped clip 67 can be removed from the hose when the hose is unwrapped for use.

The grip tube 64 of the accessory hose 52 is adapted to receive cleaning tools such as the upholstery tool 68 shown in FIGS. 1 and 2. However, any number of a variety of cleaning tools can be received on the grip tube 64 such as a crevice spray tool as seen in U.S. patent application Ser. No. 08/574,769 which is expressly incorporated herein by reference or, alternatively, a window washing tool as seen in U.S. patent application Ser. No. 08/683,608 which is also expressly incorporated herein by reference.

A closed loop grip 58 is provided at the terminal end of the handle 18 and a trigger 60 is pivotally mounted to the handle 18 inside the closed loop grip 58. As described further below, the trigger 60 is used to control the distribution of cleaning solution from the base assembly 14.

A releasable latch 40 is mounted to the base assembly 14 and is adapted to retain the handle 18 and upper housing 16 in the upright, stored position as seen in FIGS. 1 and 2. The handle 18 can be tilted rearwardly by grasping the handle 18 and depressing the latch 40 relative to the base assembly 14. With the latch 40 depressed, the handle is then tilted rearwardly with respect to the base assembly 14.

A three-position electrical switch 54 is mounted to the rear of the handle 18. The three positions of the switch are as follows: (a) all systems off, (b) the "pre-treat" position in which both the cleaning solution pump and agitation brush are on but the vacuum motor is turned off, and (c) the "cleaning position" in which the vacuum motor, agitation brush, and cleaning solution pump are all on.

An electrical cord 56 extends outwardly from the upper housing 16 and is electrically connected to the three-position switch 54. A pair of opposed cord wraps 70, 72 are provided on the upper and lower portions 51, 53 of the storage rack 50 for containing the electrical cord 56 when the machine 12 is not in use.

A large number of the operative components of the machine 12 are mounted to or provided inside the upper housing 16 and handle 18. As noted previously, the tank assembly 20 is supported on the handle 18 and upper housing 16. A vacuum motor 74 and impeller fan 76 are mounted in the round, bulbous lower portion of the upper housing 16. The upper portion of the upper housing supports a large number of components of the water distribution system such as the solution pump mixing valve which will be described in greater detail, below.

Figure 3:
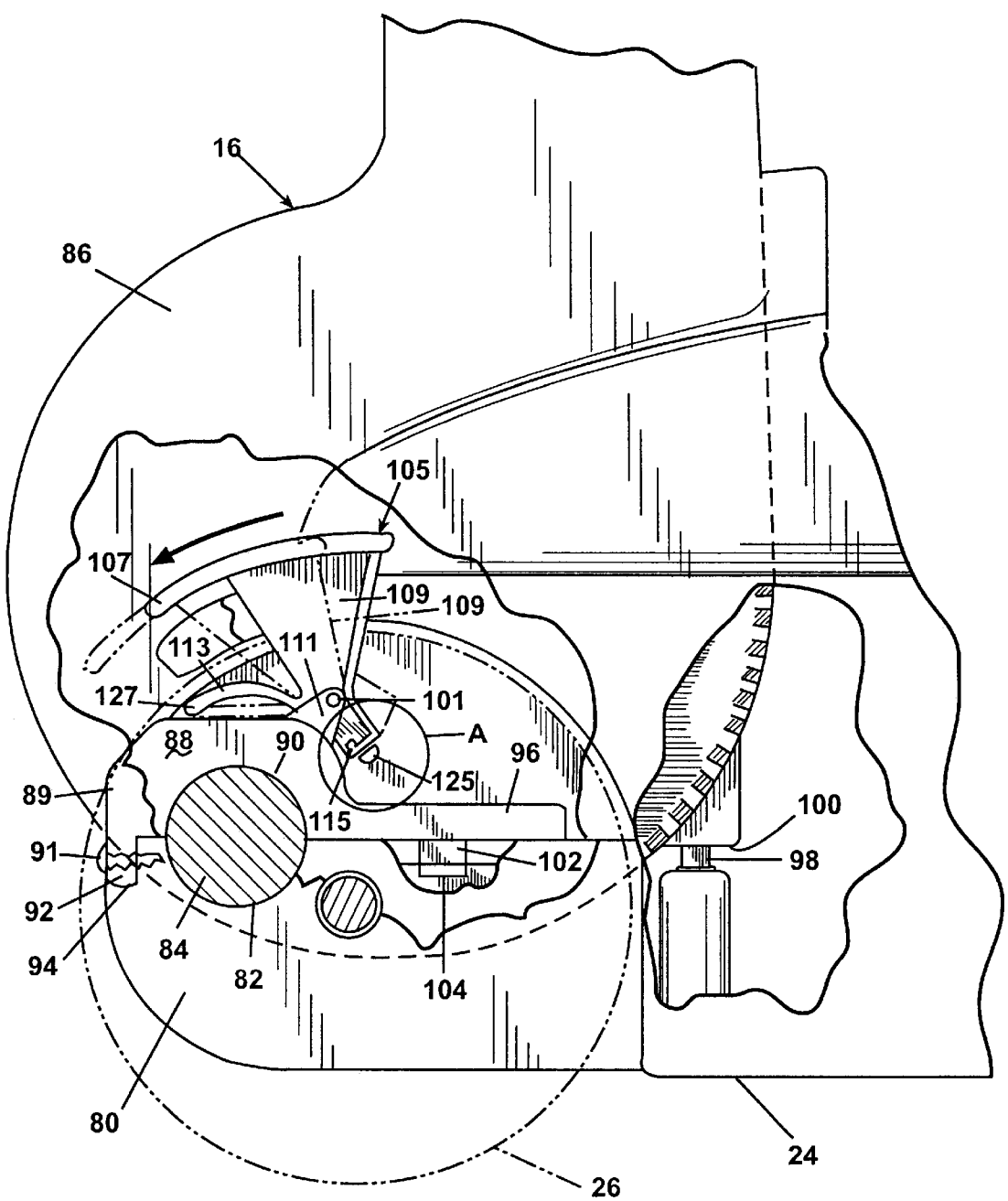
FIG. 3 is a partial, side-elevational view showing a pivot mounting and locking arrangement of the upper housing to the base according to a first embodiment.

FIG. 3 shows the pivot mounting and locking assembly of the tipper housing 16 to the base assembly 14. In this side-elevational view, the wheel 26 is shown in phantom lines to reveal the pivot mounting and locking assembly of these two elements. The pivot mounting itself is identical for both the right and left sides of the upper housing 16, and therefore, only the left side will be described in detail.

The foot or base member 24 includes an upwardly extending rear support member 80 with a semi-circular bearing surface 82 integrally formed therein. A substantially circular boss 84 extends outwardly from the sidewall 86 of the upper housing 16 and is adapted to be received in the bearing surface 82. A retention member 88 having an integrally molded substantially semi-circular bearing surface 90 formed therein is adapted to be secured to the top surface of the support member 80, thereby capturing the outwardly extending boss 84 of the tipper housing 16 between the opposed semi-circular bearing surfaces 82, 90. A projection 92 formed on the retention member 88 fits within a groove of the foot member 24. The rear portion 89 of the retention member can be secured to the foot member 24 through a screw-type fastener 91 passing through the projection 92 and into the foot member 24. A front portion 96 of the retention member 88 has a pair of tabs 102 (only one of which is shown) extending downwardly therefrom. A free end of each tab 102 includes a barb 104 that snaps within a corresponding groove (not shown) in the foot member 24 to secure the front portion 96 of the retention member 88 to the foot 24.

Figure 3A:
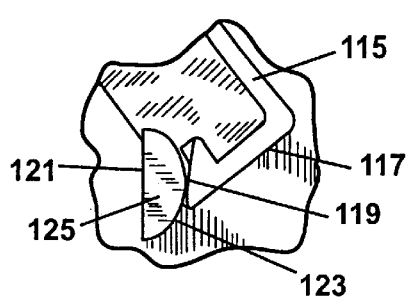
FIG. 3A is an enlarged side-elevational view shown in area A of FIG. 3 with the upper housing tilted with respect to the base.

Referring now to FIGS. 3 and 3A, a locking assembly 105 is preferably located on the left side of the cleaning machine 12, although it is to be understood that the locking mechanism can alternatively or in addition be arranged on the right side. The locking assembly 105 includes a foot engagement section 107 and a stem 109 formed integrally with the foot engagement section 107. A pivot pin 101 extends through a tab 111 on the retention member 88 and the stem 109 to pivotally attach the foot engagement section 107 to the base member 24. A flat spring 113 is integrally formed with the stem 109 with a free end 127 thereof abutting an upper surface of the retention member rear portion 89. The spring 113 biases the foot engagement section 107 toward the front portion 96. A locking extension 115 includes a flat locking surface 117 and a bearing surface 119. The base member 24 includes a semicylindrical laterally extending protrusion 125 which is located on the sidewall 86 with a flat locking surface 121 and a curved bearing surface 123.

In the normally upright position, as shown in FIG. 3, the flat locking surfaces 117, 121 abut each other or are in close proximity to each other. If a user attempts to rotate the handle 18 with respect to the foot member 24, the locking surfaces 117, 121 engage and prevent relative rotation of the handle and foot member. When the foot engagement portion 107 is depressed, as shown in phantom line, the locking extension 115 rotates away from the protrusion 125 until the locking surfaces are no longer in facing relationship. In this position, the handle 18 can be rotated with respect to the base member 24. When the handle is rotated to the upright position, the bearing surface 119 engages the bearing surface 123 to rotate the foot engagement portion 107 against the bias of spring 113 until the locking extension 115 is clear of the protrusion 125 and the locking surfaces 117, 121 are again in facing relationship.

As described further below in relation to FIG. 9, the preferred embodiment of the cleaning machine 12 incorporates a rotatably mounted agitation brush which receives the force of rotation from a brush motor mounted to the foot member 24. In any position other than the off position for the switch 54, electrical current is supplied to the brush motor for rotating the agitation brush. However, when the accessory hose 52 is being utilized, or when the handle 18 is merely in the upright position and the switch is in either the pretreat or cleaning position, it is undesirable to permit continued rotation of the agitation brush. Therefore, an interrupt switch 98 is provided in the electrical circuit between the brush motor and the source of electricity. The switch 98 is mounted to the foot member 24 and adapted to cooperate with a projection 100 extending outwardly from the front, bottom surface of the upper housing 16. In the position as shown in FIG. 3, the projection 100 bears against the switch 98, thereby opening the electrical circuit between the source of electricity and the agitation brush. Therefore, the brush will not rotate, regardless of the position of the three-position switch 54. Upon rearward titling movement of the handle 18 and upper housing 16 relative to the base assembly 14, the projection 100 will pivot out of contact with the interrupt switch 98 mounted on the foot member 24. Once the projection 100 has moved out of contact with the switch 98, then the switch 98 will assume a closed position and complete the circuit between the source of electricity and the brush motor, assuming that the three-position electrical switch 54 is in any position other than off. Alternatively, the relative position of the switch and projection can be reversed so that the switch is mounted on the upper housing and selectively contacts a projection mounted on the foot member 24. Instead of the projection 100, a spring and biased pin can be mounted to the upper housing or foot member 24 in order to provide additional travel for actuating the switch 98. When the pin is mounted to the foot member, the switch is preferably mounted to the upper housing.

In an alternative arrangement, the switch 98 can be replaced by an ON/OFF switch that is mounted at a convenient location on the cleaning machine 12 for actuation by a user.

With the upper housing 16 and handle 18 pivotally mounted to the base assembly 14, the water extraction cleaning machine can be used in a manner similar to an upright vacuum cleaning machine. In other words, the operator can grasp the closed loop grip 58 and manipulate the base assembly 14 forward and backward over the surface being cleaned.

Figure 3B:
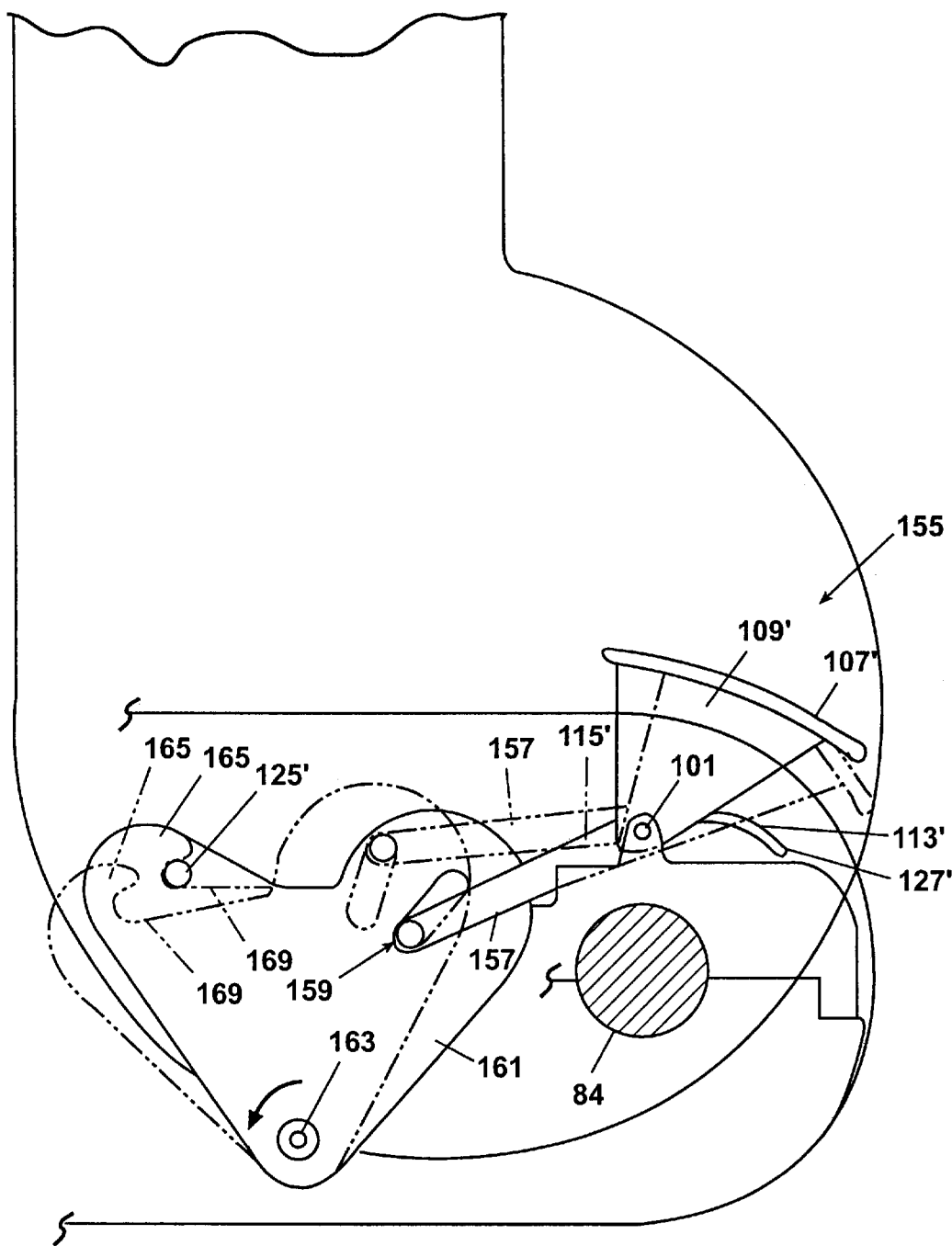
FIG. 3B is a view similar to FIG. 3 showing a pivot mounting and locking arrangement according to a second embodiment.

With reference now to FIG. 3B, a pivot mounting and locking assembly 105' according to a second embodiment is illustrated, wherein like parts in the previous embodiment are represented by like numerals. As with the assembly 105, the assembly 105' is preferably located on the left side of the cleaning machine 12, although it is to be understood that the locking mechanism can alternatively or in addition be arranged on the right side. The locking assembly 105' includes a foot engagement section 107' and a stem 109' formed integrally with the foot engagement section 107'. As in the previous embodiment, a pivot pin 101 extends through a tab 111 on the retention member 88 and the stem 109' to pivotally attach the foot engagement section 107' to the base member 24. A flat spring 113' is integrally formed with the stem 109' with a free end 127' thereof abutting an upper surface of the retention member rear portion 89. The spring 113' biases the foot engagement section 107' toward the front portion 96. A lever arm 115' is integrally molded with, or otherwise rigidly attached to the stem 109' and extends outwardly and downwardly therefrom. A pin 155 projects from the outer free end 157 of the lever arm 115' and rides in a slot 159 of a locking plate 161. The locking plate 161 is pivotally attached to the base member 24 through a pivot pin 163 and includes a hook-shaped locking portion 165 with an inner hook surface 169. The base member 24 includes a cylindrical laterally extending protrusion 125' which is located on the sidewall 86.

In the normally upright position, as shown in FIG. 3B, the inner hook surface contacts an outer surface of the protrusion 125' to prevent relative rotation of the handle and foot member. When the foot engagement portion 107' is depressed, as shown in phantom line, the pin 155 rides in the slot 159 of the locking plate 161 and forces the locking plate to pivot in a direction opposite to the pivoting direction of the foot engagement portion 107'. The hook-shaped locking portion 165 rotates away from the protrusion 125' until it is clear of the protrusion. In this position, the handle 18 can be rotated with respect to the base member 24. The locking plate then rotates to its original position under bias from the spring 113'. When the handle is rotated to the upright position, the inner surface 169 catches the protrusion 125' and forces the plate (and foot engagement portion) to rotate against the bias of the spring 113' until the protrusion 125' is seated in the hook-shaped locking portion 165.

Figure 4:
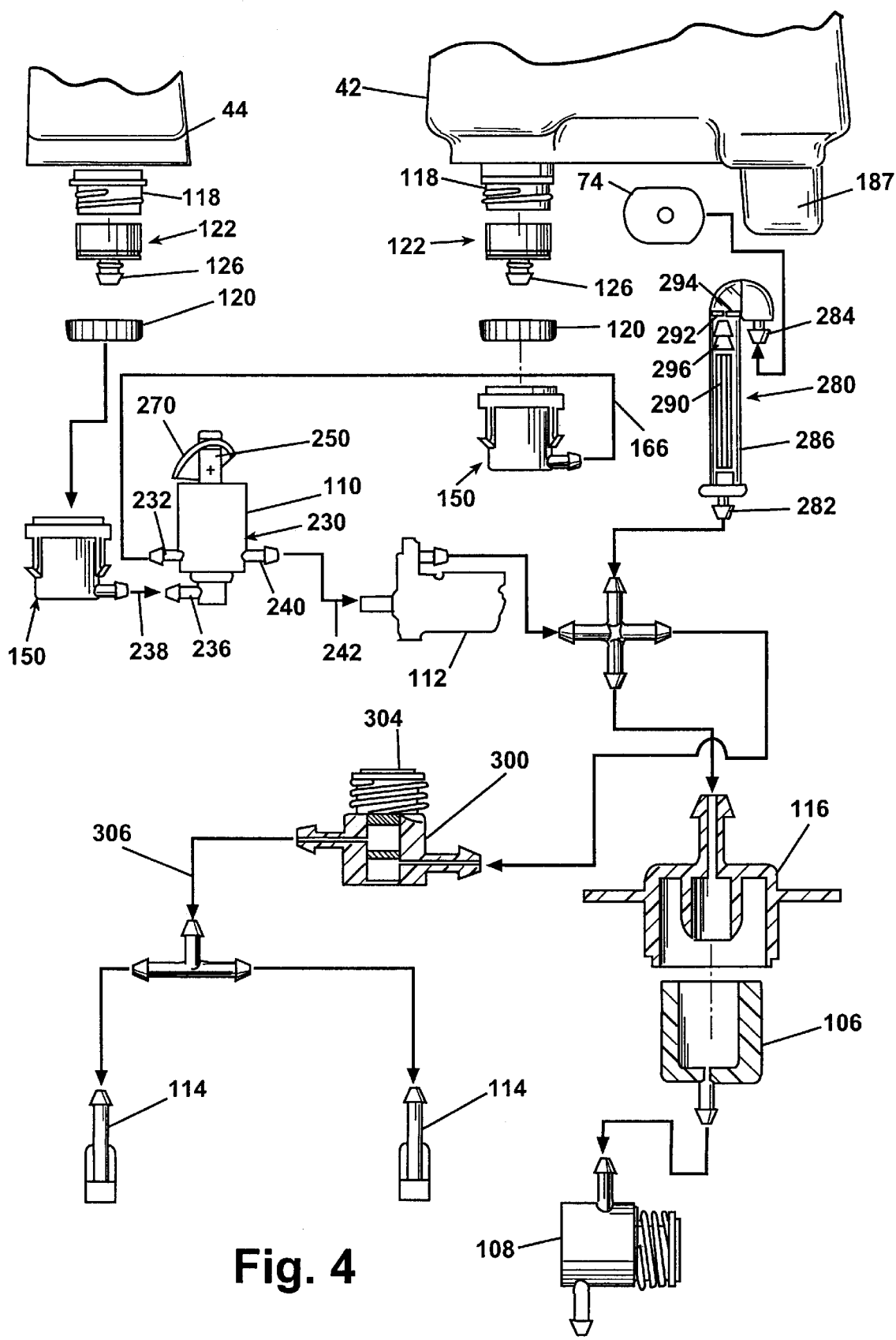
FIG. 4 is a schematic view showing the cleaning fluid distribution system of the cleaning machine of FIG. 1.

FIG. 4 is a schematic representation of the cleaning solution distribution system for the preferred embodiment of the cleaning machine. Generally, clean water and detergent are drawn from the respective tanks 42, 44 to a mixing valve 110 through the operation of a pump 112. The pump 112 then conducts the pressurized cleaning solution to spray nozzles 114 provided on the base assembly 14 or to the trigger valve 108 of the accessory hose 52 through an accessory hose solution tube mounting 116 provided on the front wall of the upper housing 16 and an accessory hose tube connector 106 mounted on the end of the hose 52 opposite the cleaning tool 68.

Figure 5:
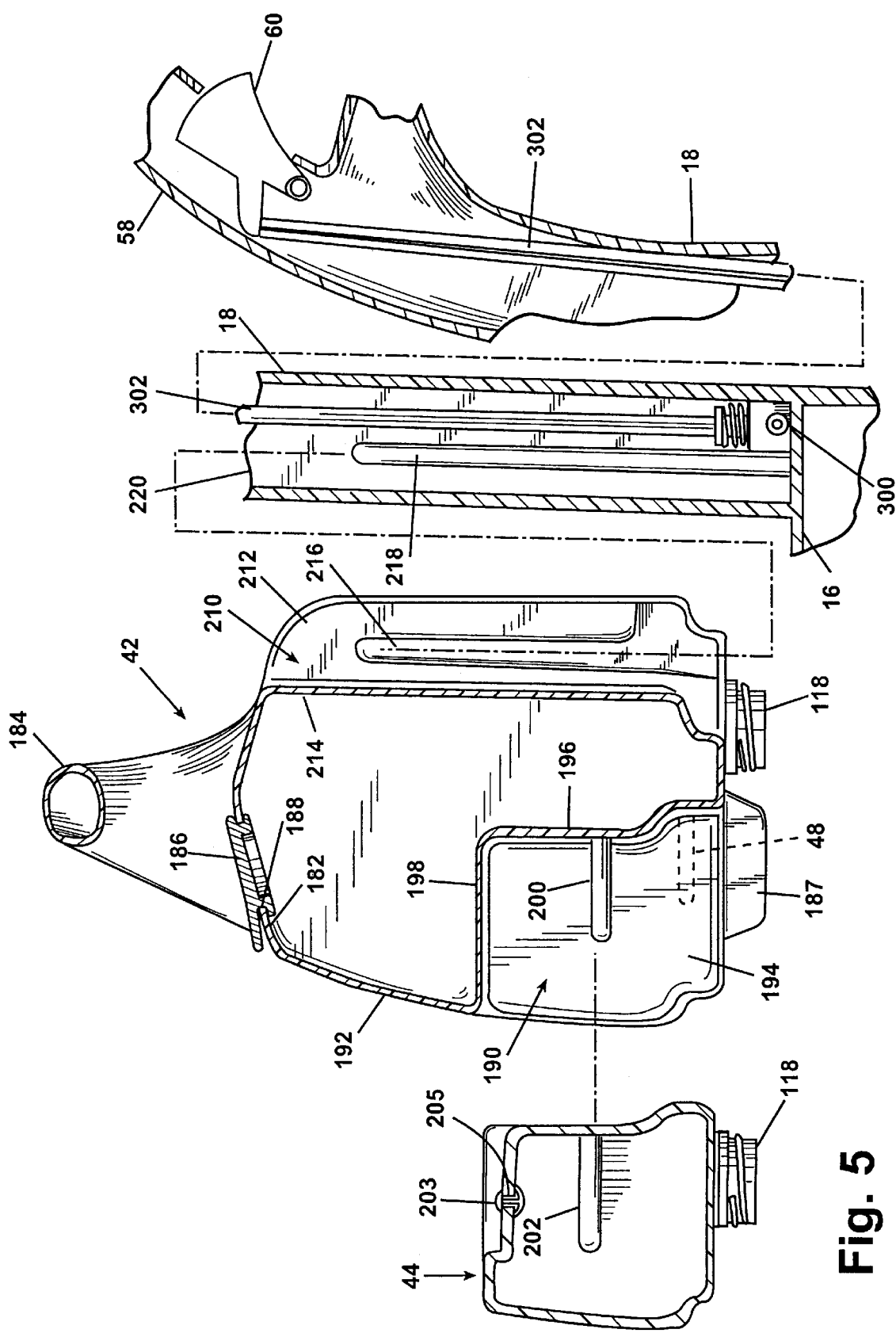
FIG. 5 is a partial, sectional, exploded view of the tank assembly and handle.
Figure 6:
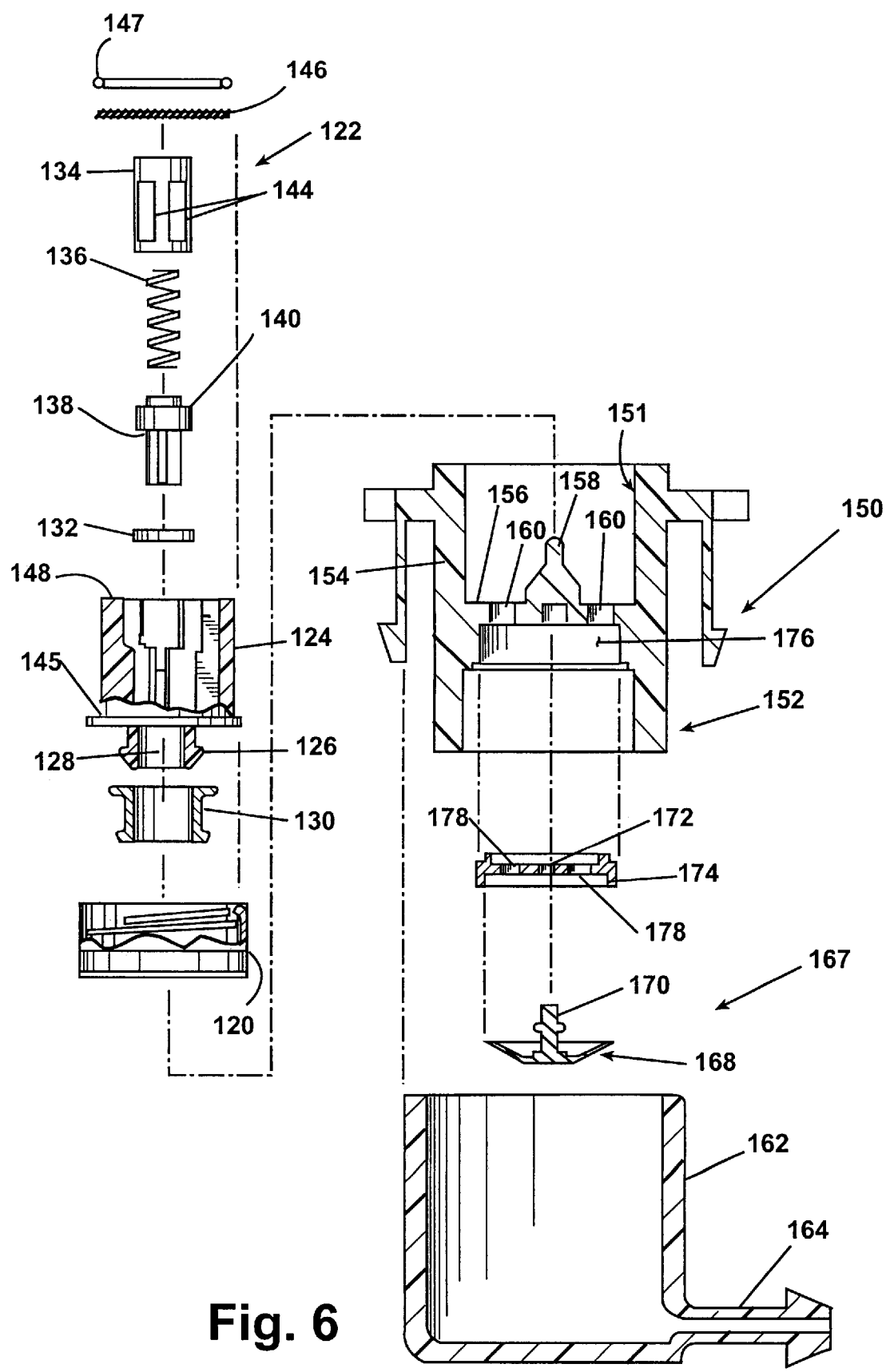
FIG. 6 is a partial, sectional, exploded view of the tank one-way valve and tank seat assembly.

Turning now to the specific structure of the cleaning solution distribution system, as seen in FIGS. 4–6, both the clean water tank 42 and the detergent tank 44 include one-way valve mechanisms 122 on the bottom surfaces thereof which cooperate with tank seat assemblies 150 provided on the upper surface of the upper housing 16 to control the flow of fluid from the tank to the other components of the distribution system. The structure of the one-way valves 122 and tank seat assemblies 150 is identical, and therefore, only the structure of the clean tank valve 122 and seat assembly 150 will be described in detail.

The bottom wall of the clean tank 42 has a downwardly extending threaded boss 118 with an aperture extending therethrough. A threaded cap 120 is rotatably received on the boss 118, and mounts a one-way valve member 122 enclosing the aperture of the boss. The valve member 122 comprises a hollow valve body 124 having a downwardly extending connector boss 126 with a fluid flow aperture 128 extending therethrough. A flexible rubber seal 130 fits around the boss 126 and is adapted to engage an inner surface 151 of the tank seat assembly 150 when the valve member is installed thereon. A gasket 132, a release rod or plunger 138 and a compression spring 136 are located within the valve body 124 and held in position by a spring housing 134. A lower end of the spring housing 134 can be securely attached to the inside of the hollow valve body through ultrasonic welding, adhesives, or other well known means. The spring housing 134 preferably has a plurality of apertures 144 to permit the flow of fluid from the tank therethrough. A screen 146 is attached to an upper end 148 of the spring housing 134 to filter out large particles of foreign material that may be present in the fluid. An outer shoulder 145 on the valve body receives an annular gasket 147 that seals around the lower edge of the boss 118 of each tank.

The release rod 138 has an annular flange 140 that seats against the gasket 132 under a biasing force from the spring 136 to prevent the flow of fluid from the tank when it is separated from the tank seat assembly 150. Preferably, the bottom of the release rod 158 is flush with the bottom of the connector boss 126, or slightly thereabove to prevent inadvertent valve opening when the tank is placed right side up on a surface.

The tank scat assembly 150 comprises a scat member 152 having a substantially circular flange 154 extending upwardly and downwardly from a base plate 156. A central projection 158 extends upwardly from the base plate 156, and a plurality of fluid apertures 160 are formed in the base plate 156 intermediate the central projection 158 and the circular flange 154. A reservoir 162 is mounted to the seat member 152 beneath the fluid apertures 160, and a conventional hose mounting 164 extends outwardly from the reservoir 162. A conventional hose 166 is mounted to the hose mounting 164 and fluidly connects the reservoir to the mixing valve 110 which is then fluidly connected to the pump 112.

The preferred embodiment of the seat assembly 150 also includes a one-way umbrella valve 167 to prevent the back flow of solution from the reservoir 162 past the base plate 156, which may occur when the liquid level in one supply tank is higher than the liquid level in the other supply tank. The one-way valve comprises an elastomeric umbrella valve member 168 having a central stem 170 extending from one side thereof which is received in an appropriate aperture 172 of a support disc 174. The disc 174 is supported in a suitable recess 176 provided in the scat member 152. The disc 174 has a plurality of flow apertures 178 provided therein, all of which are adapted to be covered by the umbrella valve 168. When either positive fluid pressure is exerted on to the top surface of the umbrella valve 168, or negative fluid pressure is created in the reservoir 162 positioned beneath the valve member 168, then the outer radius of the body of the umbrella valve 168 will deflect downwardly to permit the flow of fluid from the seat member 152 to the reservoir 162.

As described further below, the tanks are received on the handle 18 and upper housing 16 by vertical movement of the tank assembly 20 with respect to the upper housing 16. Eventually, the one-way valves 122 of the tanks will be telescopically received inside the tank seat assemblies 150 so that the central projection 158 extends upwardly through the boss 126 of the one-way valve a sufficient distance to dislodge the rod 138 from the aperture 128, thereby permitting the flow of fluid through the one-way valve and into the tank seat assembly 150. When the tank is lifted vertically with respect to the upper housing 16, the central projection 158 will be telescopically removed from the aperture 128, and the spring 136 will bias the rod 138 of the one-way valve back into scaling position to prevent the inadvertent flow of fluid through the one-way valve.

The tank assembly 20 is configured for easy refilling of the tanks and securing the tanks to the upper housing 16 and handle 18. The clean water tank 42 has an integrally molded carrying handle 184 and a cap 186 closing a fill opening aperture 188 formed on the top wall of the tank. A protrusion 187 is integrally molded with the bottom of the clean water tank and fits within a corresponding depression (not shown) in the upper housing 16. The outer wall of the protrusion facilitates alignment of the tank assembly 20 with the upper housing 16. The inner volume of the protrusion can be filled with detergent that will be mixed in a predetermined ratio when the tank 42 is subsequently filled with water, in the event that the detergent tank 44 and mixing valve are not used. The cap 186 can be quickly and easily removed for filling the tank 42 with clean water.

As noted above, the clean water is discharged through the boss 126 and one-way valve mechanism 122 provided on the bottom wall of the clean water tank 42. A vent opening 182 extends through the upper wall of the tank 42 to allow entry of air when water is removed from the tank from the valve mechanism 122. If the plunger 138 becomes stuck during operation, the vent opening 182 prevents siphoning if liquid should leak past the plunger.

The detergent tank 44 nests into a recess 190 accessible through the front wall 192 of the clean water tank 42. Preferably, the recess 190 is formed in the front, bottom edge of the clean water tank and is defined by a pair of opposed sidewalls 194, a rear wall 196, and a top wall 198. A pair of substantially horizontal projections 200 are provided on the sidewalls 194 of the recess 190. These projections 200 are adapted to cooperate with a pair of substantially complimentary grooves 202 formed in the sidewalls 204 of the detergent tank 44 for mounting the tanks to one another. The detergent tank 44 is removed from the clean water tank 42 by sliding the detergent tank 44 forward, parallel to the axis of the projections 200 and grooves 202, until the detergent tank 44 is removed from the recess 190.

The detergent tank 44 must be refilled by unscrewing the cap 120 of the one-way valve assembly and removing the valve member 122 to permit refilling of the tank 44 through the boss aperture. The detergent tank 44 has an umbrella valve 203 (FIG. 5) that fits within a venting aperture 205 on the tank 44 to prevent fluid leakage when the tank is inverted for refilling. The umbrella valve 203 is preferably similar in construction to the one-way umbrella valve 167 in FIG. 6. Once the tank 44 has been refilled, the one-way valve member 122 and cap 120 are replaced, the tank 44 is inverted, and then slid into the recess 190 of the clean water tank 42.

As noted briefly above, the tank assembly 20 is preferably slidably mounted to the handle 18. The rear wall of the clean water tank 42 includes a U-shaped groove 210 which is substantially complementary to the front portion of the handle 18. The groove 210 is defined by a pair of opposed sidewalls 212 and a front wall 214. The sidewalls 212 include a pair of linear grooves 216 which are complementary to a pair of linear projections 218 formed on sidewalls 220 of the handle 18. The handle projections 218 extend only a portion of the length of the handle 18. The tank assembly 20 is slidably received on the handle 18 by positioning the tank assembly 20 vertically above the upper housing 16 so that the projections 218 and grooves 216 are aligned with one another. Then the tank assembly 20 is lowered so that the tank assembly 20 is slidably received on the handle 18 and the grooves 216 receive the projections 218. The tank assembly 20 is fully received on the handle 18 when the one-way valve assemblies of the tanks 20 engage the seat assemblies 150 provided on the top wall of the upper housing 16. The tank seat assemblies 150 are not rigidly mounted horizontally in order to allow alignment of the two tank outlets, which would otherwise cause leaks. Once the tank assembly is in this position, the latches 46 can then be pivoted onto the projections 48 for locking the tank assembly 20 to the handle 18 and upper housing 16.

Figure 8:
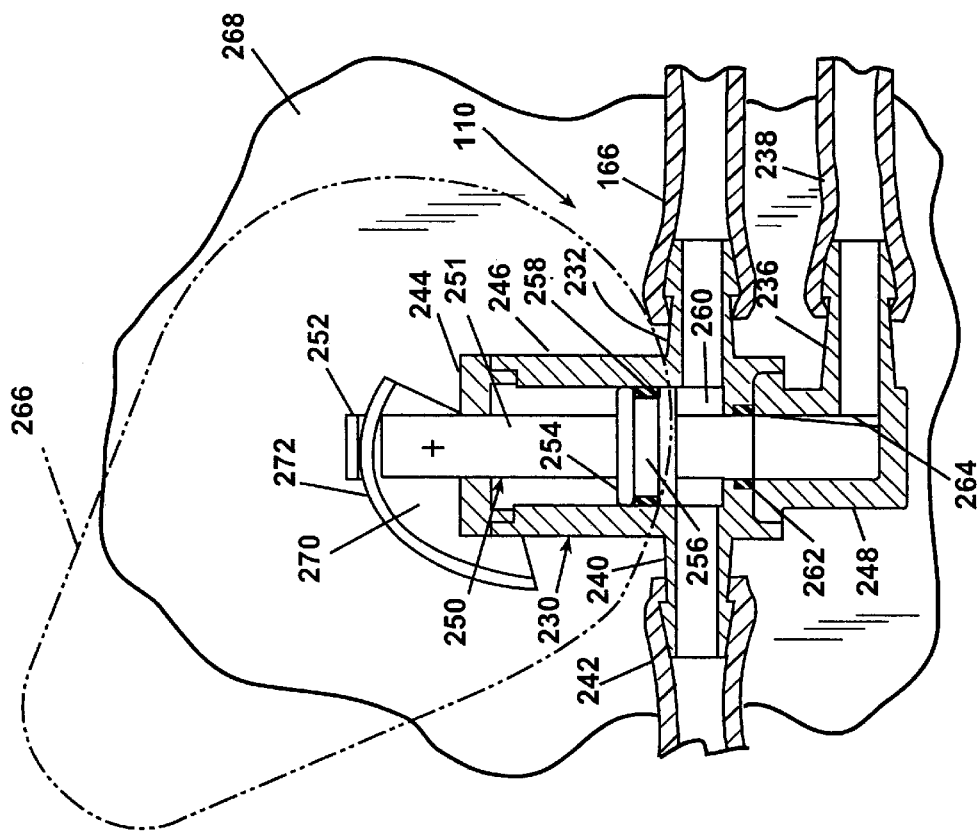
FIG. 8 is a partial sectional view of the variable fluid mixing valve of FIG. 7 shown in a second position.
Figure 7:
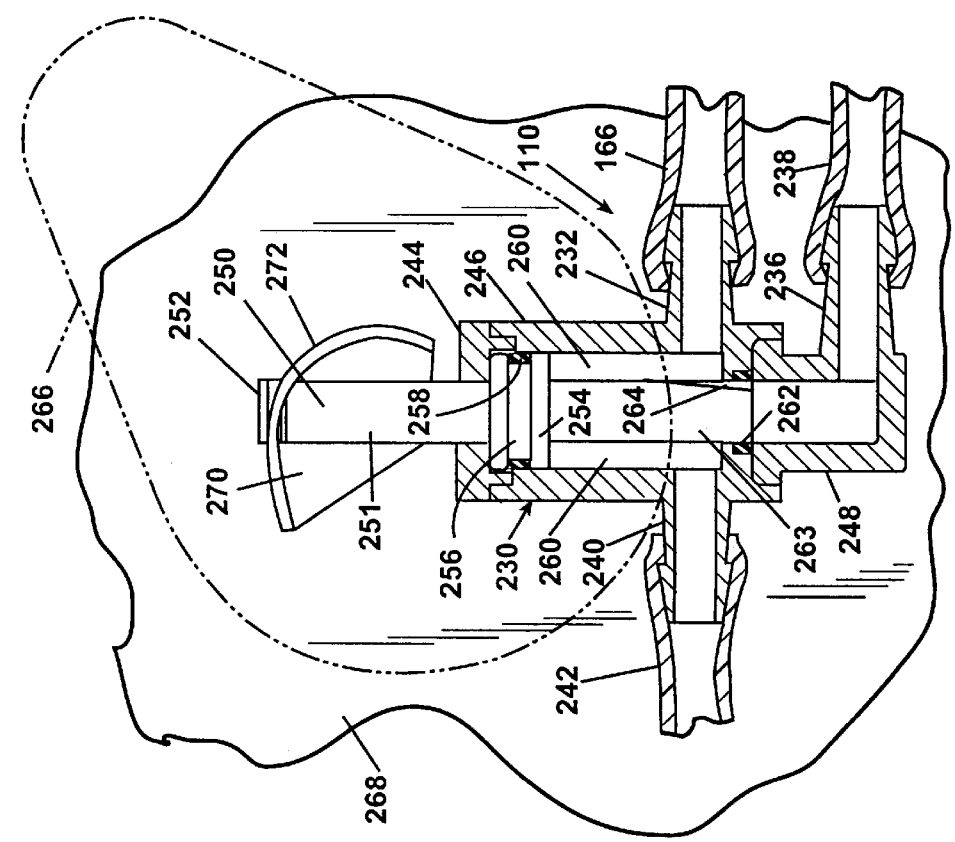
FIG. 7 is a partial sectional view of the variable fluid mixing valve mechanism shown in a first position.

Returning to the solution flow schematic diagram seen in FIG. 4, the mixing valve 110 is positioned intermediate the tank seat assemblies 150 and the solution pump 112. Preferably, the mixing valve is a variable mixing valve 110 to accommodate differing mixtures of detergent and clean water. As seen in FIGS. 4, 7, and 8, the variable mixing valve 110 comprises a valve body 230 having a clean water inlet 232 which is fluidly connected to the clean water tank seat assembly 150 by the hose 166 and a detergent inlet 236 which is fluidly connected to the detergent tank seat assembly 150 by a hose 238. A solution outlet 240 is also formed on the valve body 230 and is adapted to conduct the clean water and detergent mixture from the mixing valve 110 to the pump 112 through a hose 242.

The valve body is formed from an end cap 244, a central body portion 246, and an end inlet member 248 mounted to the end of the central body portion 246 opposite the end cap 244. A plunger 250 extends through an aperture in the end cap 244 such that a shaft 251 of the plunger 250 is received inside the central body portion 246 and the end inlet member 248 and a portion of the shaft extends outwardly from the end cap 244. A cam follower 252 is formed at the outer end of the shaft 251 and is adapted to ride along a contoured cam surface 272 of a cam 270, as seen in FIG. 7. A plunger head includes a collar 254 that is positioned along the length of the shaft of the plunger 250 and has an annular groove 256 formed therein that receives an O-ring 258. The collar 254 and O-ring 258 are adapted to create a fluid seal inside the circular valve body and in cooperation with the central body portion define a mixing chamber 260 therein. An O-ring 262 is provided in the central body portion 246 immediately adjacent the end inlet member 248. The O-ring 262 cooperates with the plunger 250 to effectively seal the end inlet member 248 and detergent inlet 236 from the mixing chamber 260, depending upon the axial position of the plunger 250 within the valve body 230.

The plunger 250 forms a valve stem 263 at one end with a tapered groove 264 which extends along the surface of the plunger valve stem 250, preferably passing through the end wall of the plunger 250, and is tapered so that the groove 264 has a greater cross-sectional area immediately adjacent the end than it does a spaced distance therefrom. The valve stem 263 is positioned in the detergent inlet 236 opening to control the flow of detergent therethrough. The purpose of the tapered groove 264 is to accommodate varying flow rates of detergent through the opening in the detergent inlet 236 into the mixing chamber 260 of the valve body 230.

A control knob 266 is mounted on the front wall 268 of the upper housing 16 for controlling the water/detergent ratio in the cleaning solution delivered to the pump 112. The cam 270 is mounted to the rear surface of the knob 266, and the cam 270 is positioned so that the terminal end of the plunger 250 bears against the contoured surface 272 of the cam 270. FIGS. 7 and 8 depict the two extreme ranges of solution mixtures in the preferred embodiment of the cleaning machine 12. FIG. 7 shows the plunger 250 extended outwardly from the valve body 230 the maximum distance. In this position, the maximum length of the tapered groove 264 is extended into the mixing chamber 260 of the valve. Therefore, the maximum amount of detergent will be drawn into the mixing chamber 260 and ultimately discharged to the pump 112.

FIG. 8 depicts the other extreme position in which the plunger 250 is positioned so that the entire length of the tapered groove 264 is withdrawn from the mixing chamber 260 so that there is no fluid flow communication between the detergent inlet 236 and the mixing chamber 260. Therefore, only clean water will be directed to the pump 112. As is evident, the contoured surface 272 of the cam 270 permits an infinite number of detergent to water mixing ratios between the two extremes shown in FIGS. 7 and 8. In the preferred embodiment, the knob 266 and cam 270 are received in only one of three positions, the water only or "rinse" position as seen in FIG. 8, a maximum detergent to water mixing ratio as seen in FIG. 7, or a standard mixing ratio half-way between the extremes shown in FIGS. 7 and 8. In use, the knob 266 is intended to be positioned at the standard mixing ratio position for the vast majority of cleaning operations. When a high traffic or heavily stained area is encountered, the knob 266 can be rotated to the maximum detergent position as seen in FIG. 7. If a final clean water rinsing operation is desired, then the knob 266 can be rotated to the water only position as seen in FIG. 8. The incorporation of the variable mixing valve 110 permits varying the water/detergent mixture ratios to accommodate a wide variety of cleaning situations.

With reference again to FIG. 4, and as noted above, the pump 112 is positioned downstream from the variable mixing valve 110. When the pump 112 is energized and primed, the pump 112 will draw fluid from the mixing valve 110 and tank seat assemblies 150 at the prescribed ratio. Although different pump types can be used, the pump 112 preferably does not self-prime. Some means, therefore, should be incorporated to assist priming of the pump 112. The fluid flow system in FIG. 4 includes a pump priming valve 280 which is preferably mounted vertically above the pump 112, the tank seat assemblies 150 in the base of the handle 18, and the water level in the tank 42. The pump priming valve 280 includes an inlet port 282 that is fluidly connected to the outlet of the pump 112 and a fluid outlet port 284 that is fluidly connected to the impeller fan chamber of the vacuum motor 74 (FIG. 2), or a portion of the recovery tank that is exposed to vacuum pressure. The pump priming valve 280 comprises a hollow valve body having an inner chamber 286. Preferably, a small shoulder 292 with a central aperture 294 is formed inside the valve body. An elongate plunger 290 having a conical rubber sealing tip 296 is received for reciprocal movement inside the ball chamber. The priming valve 280 may also include a vent aperture (not shown) to prevent potential siphoning.

In operation, the pump 112 will be primed with the fluid from the solution tanks by turning the pump 112 on and the vacuum motor 74 on. The vacuum motor 74 will exert negative pressure on the fluid outlet of the pump 112 through the pump priming valve 280 thereby drawing any air out of the pumping chamber (not shown) between the pump inlets and the solution tanks therethrough. The air will be drawn through the pump priming valve 280 into the vacuum impeller fan chamber or into the recovery tank 30. Preferably, the weight and dimensions of the plunger 290 is coordinated with the amount of negative air pressure applied to the pump priming system from the vacuum motor so that the negative air pressure applied to the fluid chamber 286 is insufficient, by itself, to draw the plunger 290 upwardly and seal the outlet of the pump priming valve.

As the vacuum motor 74 operates to draw the air from the system, it is likely that some fluid will enter the pump priming valve 280. Preferably, the size of the elongated fluid chamber 286 is dimensioned to accommodate a sufficient amount of fluid to permit full priming of the pump 112. Eventually, the fluid level will rise inside the pump priming valve 280 and fluid will enter the ball chamber 286. The plunger 290 is preferably formed of a material and dimension such that the fluid alone does not cause the plunger to rise in the chamber. However, the combined pulling force from the negative air pressure and the pushing force from the rising liquid inside the chamber acting on the plunger causes the plunger to rise until the sealing tip 296 bears against the shoulder 292 and seals the aperture 294 to prevent solution from flowing therefrom. Once this seal has established, the pump should be sufficiently primed for normal operation. Alternative seals are shown in FIGS. 19 and 20. In FIG. 19, a spherical plug 297 is shown in the place of the conical sealing tip according to the invention. In FIG. 20, a planar plug 298 is shown in the place of the conical sealing tip according to the invention.

Figure 15:
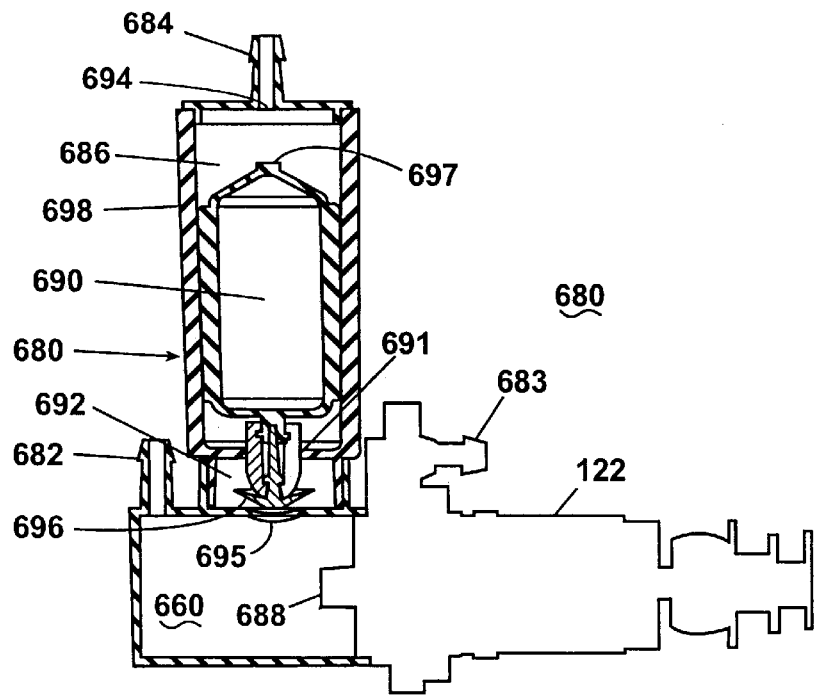
FIG. 15 is a cross-sectional view of a pump and pump priming assembly illustrating a second embodiment of the invention with a plunger in a first position.
Figure 16:
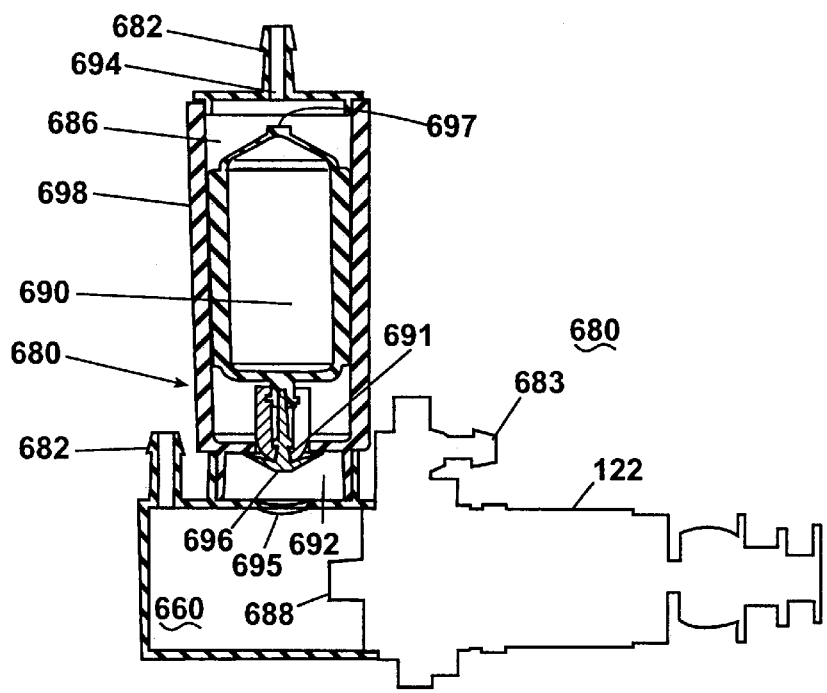
FIG. 16 is a cross-sectional view of a pump and pump priming assembly of FIG. 15 with the plunger in a second position.

An alternative pump-priming assembly 680 is disclosed in FIGS. 15 and 16. The pump-priming assembly 680 includes a priming chamber 660 for flooding the inlet nose 688 of the pump 112, an inlet port 682 for the chamber 660 that is fluidly connected to the inlet nose 688 of the pump 112, and a pump outlet port 683. A vacuum port 684 is fluidly connected to the vacuum motor 74 or a portion of the recovery tank 30 that is in fluid communication with the vacuum motor 74. The pump-priming assembly 680 also includes a hollow valve body 698 having a plunger chamber 686 and a valve chamber 692. A valved opening 695 joins the valve chamber 692 and the priming chamber 660. An outlet opening 691 joins the valve chamber 692 and the plunger chamber 686. In addition, an aperture 694 is formed at an upper inside portion of the valve body 698 to fluidly connect the valve body 698 and the outlet 684. An elongate buoyant plunger 690 having a top portion 697 at one end and a rubber umbrella valve 696 at the other is received for reciprocal movement inside the valve body 698. More specifically, the umbrella valve 696 reciprocates between the valved opening 695, as shown in FIG. 15, and the outlet opening 691, as shown in FIG. 16, within the valve chamber 692. Thus, the plunger chamber 686 substantially houses the elongate plunger 690, while the valve chamber 692 houses the umbrella valve 696, which is coaxially attached to the elongate plunger 690 for reciprocal axial movement therewith.

The pump-priming assembly 680 illustrated in FIGS. 15 and 16 can be used in the extraction cleaning machine disclosed above with respect to FIGS. 1–14. Alternatively, it can be used in the extraction cleaning machine disclosed in U.S. patent application Ser. No 09/112,527, filed Jul. 8, 1998, which is incorporated herein by reference.

In operation, the pump 112 will be primed with fluid from the fluid supply, such as mixing valve 110, by activating the pump 112 and the vacuum motor 74, which will exert negative pressure on the vacuum outlet 684, thereby drawing any air out of the priming chamber 660 and plunger chamber 686, and further overcoming any negative pressure exerted on the fluids in the fluid supply conduits connecting the fluid supply to the pump 112. The air will be drawn through the valve body 698 and out the vacuum outlet 684. Preferably, the weight and dimension of the plunger 690 is coordinated with the amount of negative air pressure applied to the pump-priming assembly 680 so that the negative air pressure applied to the plunger chamber 686 is insufficient by itself to draw the plunger 690 upwardly and seal the outlet opening 691.

As the vacuum motor 74 operates to draw the air from the system, fluid fills the priming chamber 660 and enters the valve chambers 692 and plunger chamber 686. Eventually, the fluid level will fill the valve chamber 692 and rise inside the plunger chamber 686, pushing the plunger 690 upwardly and causing the umbrella valve 696 to seal the outlet opening 691 as shown in FIG. 16, thereby preventing water from rising further in the plunger chamber 686 and being sucked into the vacuum motor 74. Because the inlet nose 688 is submersed at this point, water enters the pump 112 and primes it. As the pump 112 sucks water from the priming chamber 660, the plunger 690 is drawn downward in the plunger chamber 686, and the umbrella valve 696 descends therewith in the valve chamber 692 to activate a seal in the opposite direction, as the umbrella valve 696 seats in the valved opening 695. The reverse seal prevents air from being sucked into the priming chamber 660 from the fluidly connected chambers 692, 686. This cycle repeats each time a trigger 60 in the closed loop grip 58 of the handle 18 as described below is activated or the unit is powered off and on again. Once the reverse seal has been established, the chamber 660 should remain filled, the nose 688 of the pump 112 flooded, and, thus, the pump 112 sufficiently primed for normal operation.

Figure 17:
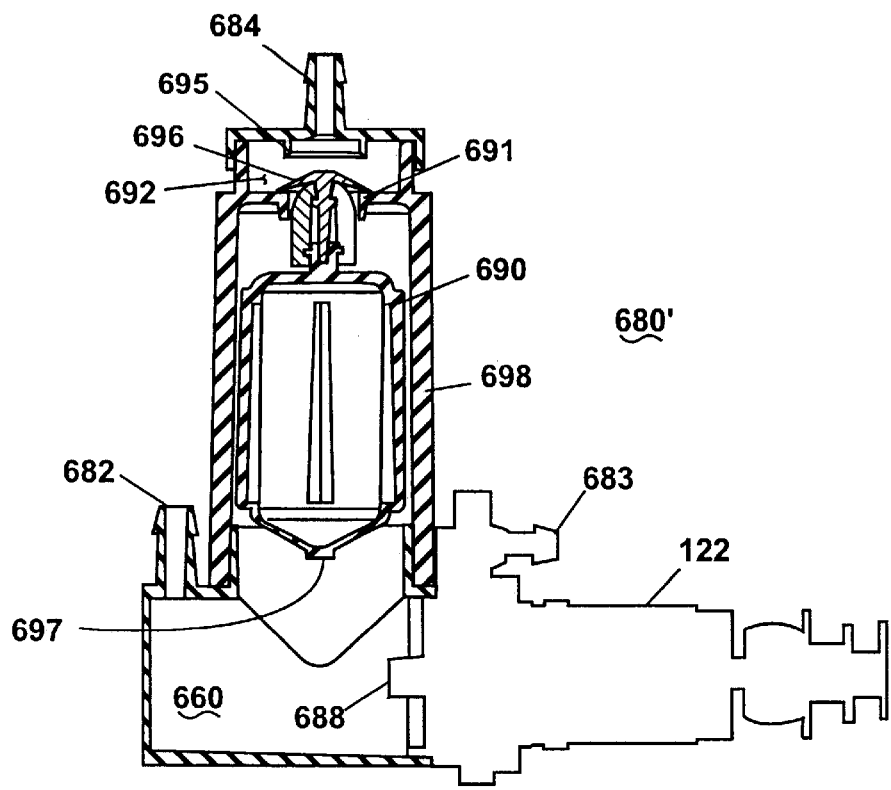
FIG. 17 is a cross-sectional view of a pump and pump priming assembly illustrating a second embodiment of the invention with a plunger in a second position.
Figure 18:
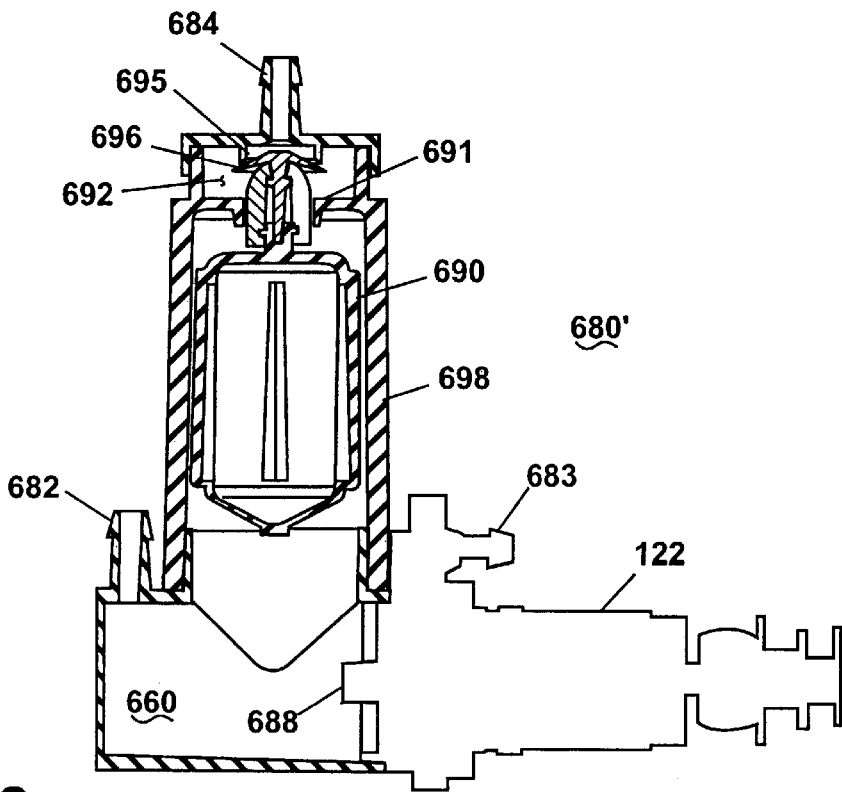
FIG. 18 is a cross-sectional view of a pump and pump priming assembly of FIG. 17 with the plunger in a second position.

A variation of the pump priming assembly 680 is shown in FIGS. 17 and 18 as pump priming assembly 680'. The hollow valve body 698 is inverted so that the plunger chamber 686 is now open to the priming chamber 660 and the top portion 697 of the elongate plunger 690 is directed downwardly toward the priming chamber 660. The outlet opening 691 joins the valve chamber 692 and the plunger chamber 686. The valved opening 695 is incorporated in conjunction with the aperture 694 formed at an upper inside portion of the valve body 698 to fluidly connect the valve body 698 and the vacuum port 684. The umbrella valve 696 reciprocates between the valved opening 695 and the outlet opening 691, within the valve chamber 692. In the alternative to the umbrella valve 696 of FIGS. 15–18, spherical and planar plugs 700, 702 are shown in FIGS. 21 and 22. In FIG. 21, a spherical plug 700 is shown in the place of the umbrella valve 696. In FIG. 22, a planar plug 702 is shown in the place of the conical sealing tip according to the invention. The plugs 700, 702 are further acceptable in the alternative to the umbrella valve 696 of the pump priming assembly 680 of FIGS. 15 and 16.

The plunger chamber 686 substantially houses the elongate plunger 690, while the valve chamber 692 houses the umbrella valve 696, which is coaxially attached to the elongate plunger 690 for reciprocal axial movement therewith.

The pump-priming assembly 680' illustrated in FIGS. 17 and 18 can be used in the extraction cleaning machine disclosed above with respect to FIGS. 1–14. Alternatively, it can be used in the extraction cleaning machine disclosed in U.S. patent application Ser. No. 09/112,527, filed Jul. 8, 1998, which is incorporated herein by reference.

In operation, the pump 112 will be primed with fluid from the fluid supply, such as mixing valve 110, by activating the pump 112 and the vacuum motor 74, which will exert negative pressure on the vacuum port 684, thereby drawing any air out of the priming chamber 660 and plunger chamber 686, and further overcoming any negative pressure exerted on the fluids in the fluid supply conduits connecting the fluid supply to the pump 112. The air will be drawn through the valve body 698 and out the vacuum port 684. As before, the weight and dimension of the plunger 690 is preferably coordinated with the amount of negative air pressure applied to the pump-priming assembly 680 so that the negative air pressure applied to the plunger chamber 686 is insufficient by itself to draw the plunger 690 upwardly and seal the valved opening 695.

As the vacuum motor 74 operates to draw the air from the system, fluid fills the priming chamber 660 and now enters the plunger chamber 686. Eventually, the fluid level will rise within the plunger chamber 686, pushing the plunger 690 upwardly and causing the umbrella valve 696 to seat in the valved opening 695 as shown in FIG. 18, fluidly disconnecting the vacuum motor 74 from the pump-priming assembly 680 and thereby preventing water from rising further in the plunger chamber 686 and being sucked into the vacuum motor 74. Because the inlet nose 688 is submersed at this point, water enters the pump 112 and primes it. As the pump 112 sucks water from the priming chamber 660, the plunger 690 is drawn downward in the plunger chamber 686, and the umbrella valve 696 descends therewith in the valve chamber 692 to activate a seal in the opposite direction, as the umbrella valve 696 seals the outlet opening 691. The reverse seal prevents air from being sucked into the priming chamber 660 from the fluidly connected chambers 692, 686. This cycle repeats each time a trigger 60 in the closed loop grip 58 of the handle 18 as described below is activated or the unit is powered off and on again. Once the reverse seal has been established, the chamber 660 should remain filled, the nose 688 of the pump 112 flooded, and, thus, the pump 112 sufficiently primed for normal operation.

Referring again to the embodiment of FIG. 4, following the pump priming valve 280, the pressurized solution is simultaneously directed to the accessory hose solution tube mounting 116 and a conventional trigger valve 300. As seen in FIGS. 4 and 5, the trigger valve 300 is positioned in the base of the handle 18 immediately below the bottom end of an actuator rod 302. The rod 302 extends upwardly to pivotally interconnect with the trigger 60 provided in the closed loop grip 58 of the handle 18. In the preferred embodiments, multiple actuator rods 302 are interconnected to traverse the distance between the trigger 60 and the trigger valve 300.

Upon squeezing of the trigger 60 relative to the closed loop grip 58, the actuator rods 302 are displaced downwardly to squeeze the plunger 304 of the conventional trigger valve 300 and permit the flow of fluid therethrough. With the trigger valve 300 in the open position, pressurized fluid flows through a conventional conduit 306 to a pair of spray tips 114 mounted to the foot member 24 immediately adjacent the agitation brush. Preferably, the spray tips 114 are adapted to create a fan-shaped spray pattern which traverses substantially the entire width of the agitation brush and suction nozzle opening.

Figure 10:
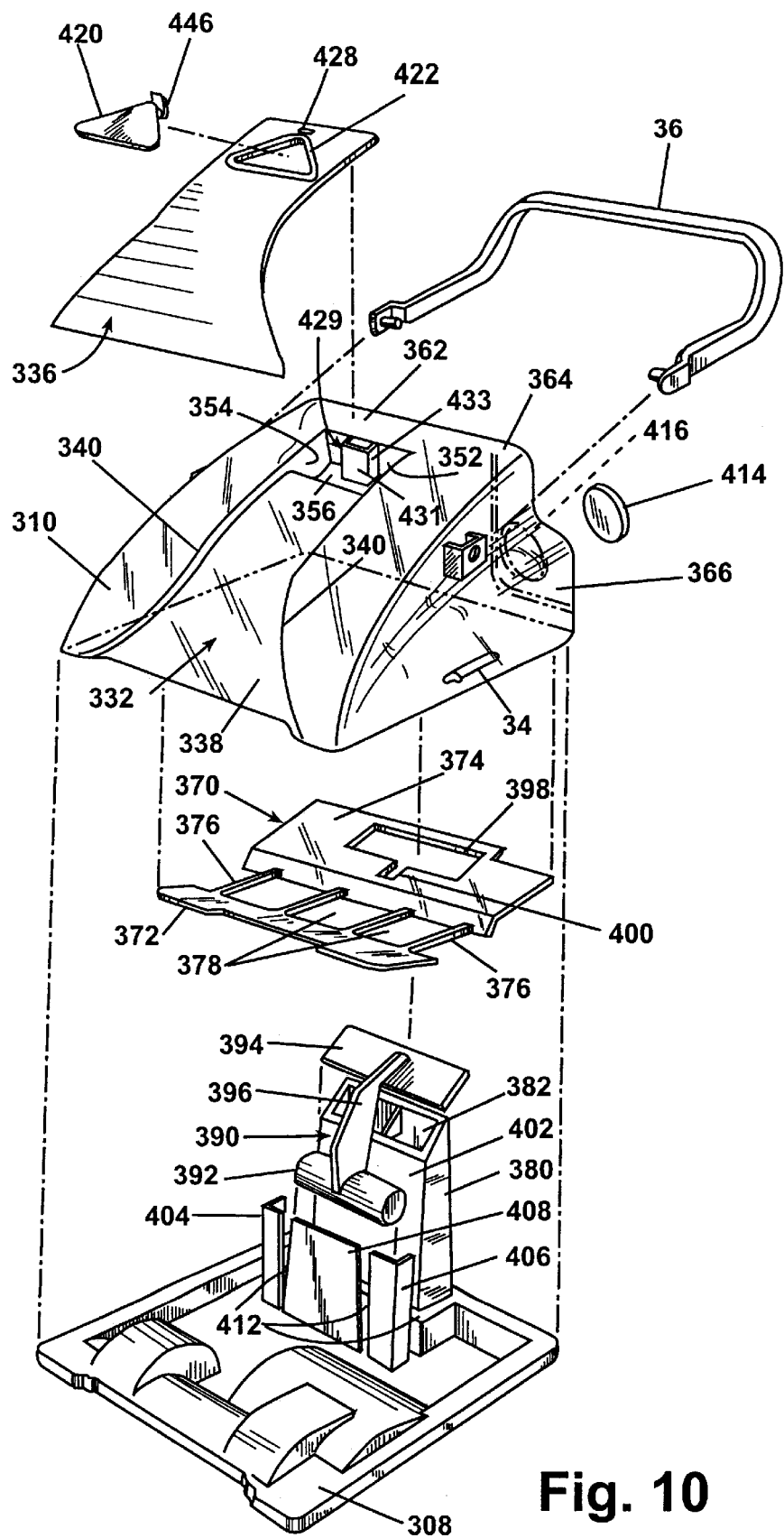
FIG. 10 is an exploded view of the recovery tank assembly.

Turning now to the fluid recovery system, the vacuum motor 74 and impeller fan 76 generate negative air pressure which is communicated from the upper housing 16 to the base assembly 14 for recovery of used solution and dirt. As shown in FIGS. 9 and 10, the working air flow path for on-the-floor cleaning begins at the suction nozzle opening 316 provided at the front, forward edge of the base assembly 14. Preferably, the suction nozzle opening is defined by a front plate member 318 and a rear plate member 320 which are mounted to one another and which also define the initial working air flow conduit 322. The suction nozzle opening 316 extends the entire width of the base assembly 14 and the plate members 318, 320. A pair of sidewalls 324 are integrally formed into the rear plate member to define the sides of the initial flow conduit. Preferably, the sidewalls 324 taper upwardly and inwardly (see FIG. 1). The initial flow conduit 322 terminates at an outlet 326 positioned along the top edges of the plate members and sidewalls. In view of the fact that the sidewalls of the flow conduit taper upwardly and inwardly, the length of the outlet of the initial suction flow conduit is less than the length of the suction nozzle opening and the width of the base assembly 14. Preferably, an elastomeric gasket 328 is mounted to the top edges of the front and rear plates 318, 320 and surrounds the outlet 326.

From the initial flow conduit 322, the air/water/debris mixture flows into recovery tank 30 which is an assembly of a bottom member 308 and a top member 310 having a top wall 364, a pair of sidewalls 366, and a rear wall 368. The working air flows from the initial flow conduit 322 to an intermediate working air flow conduit 330 which is defined by a depression 332 formed in the top wall 364 of the recovery tank 30 and a cover plate 336 secured thereto. The depression 332 comprises a bottom wall 338 and a pair of opposed sidewalls 340. Preferably, the sidewalls 340 initially taper inwardly from the inlet 342 of the intermediate working air conduit a short distance and then ultimately extend parallel to one another approaching the outlet 344 of the intermediate working air conduit 330. Preferably, the cover plate 336 is formed of a transparent, plastic material, and the top wall 364 and sidewalls 346 of the recovery tank 30 are formed of a smoky, translucent material. Utilizing these materials and the structure of the intermediate flow conduit 330, the user can easily observe the dirt and water passing up through the intermediate flow conduit 330 and also easily observe the fluid level inside the recovery tank 30.

The outlet 344 of the intermediate flow conduit 330 is positioned immediately adjacent an air/water separator baffle 350 which is integrated into the recovery tank 30 and is formed by a downwardly extending rear wall 352, a pair of parallel, downwardly extending sidewalls 354, and a bottom wall 356 extending forwardly from the rear wall 352. A sealing pocket 429 is integrally formed along the rear wall 352. With this structure, the working air flow enters the hollow interior of the recovery tank 30 and is immediately redirected approximately 180 degrees to travel forwardly and downwardly into the tank interior away from the tank outlet 382. The water and dirt will enter the air/water separator baffle 350 and strike the various walls of the baffle 350 and fall downwardly into the tank.

In addition to the redirection of the working air flow as it enters the tank 30, the effective cross-sectional area of the working air conduit is dramatically increased as the air/water mixture passes from the intermediate working air conduit into the air/water separator baffle and the recovery tank. This sudden increase in cross-sectional area results in a significant drop in velocity for the working air, thereby assisting in the separation of dirt and water from the air.

A fluid containment baffle 370 is mounted inside the hollow interior of the recovery tank 30 to prevent excessive sloshing of the recovered dirt and liquid and contain any foam generated inside the tank. The baffle 370 comprises a front, downwardly extending portion 372 and a rear downwardly extending portion 374 which are spaced from one another but interconnected to one another by multiple stringers 376. The stringers 376 and edges of the front 372 and rear portions 374 define fluid apertures 378 therebetween. Preferably, the baffle 370 is mounted to the rear wall 368, sidewalls 366, and top wall 364 of the top member 310 a spaced distance from the bottom member 308. Preferably, the fluid flow apertures 378 are positioned immediately below the air/water separator 350 so that as the dirt and water drop therefrom, they pass through the apertures 378 into the lowermost portion of the recovery tank 30.

The front 372 and rear 374 portions of the baffle 370 are contoured to prevent excessive sloshing of the recovered liquid during movement of the cleaner 12. For example, when the user is moving the base assembly 14 forward and then reverses the direction and pulls the base assembly 14 rearwardly, the water and dirt present within the tank will surge toward the front of the recovery tank 30. The water will strike the sloping top wall 364 of the recovery tank 30 and be deflected rearwardly. Any water which may be deflected upwardly will strike the downwardly extending front portion 372 of the baffle 370 and, therefore, be deflected downwardly to the lowermost portion of the recovery tank 30. The downwardly extending rear portion 374 of the baffle 370 will similarly deflect fluid downwardly. The baffle 370 serves to prevent excessive sloshing of fluid in the tank and also provides the added benefit of containing any foam which may build up in the tank beneath the baffle 370 spaced away from the air/water separator baffle 350 and fluid outlet.

An air flow outlet stand pipe 380 is integrally formed into the bottom member 308 and is provided at the rear of the recovery tank 30. The stand pipe extends upwardly to a point adjacent the uppermost portion of the recovery tank 30, opposite the outlet of the air/water separator baffle 350. In addition, an inlet opening 382 of the stand pipe 380 is positioned vertically above the baffle 370. With this stricture, the substantially dry air exiting the air/water separator 350 will pass around the bottom 356 and sidewalls 354 of the air/water separator 350 and through the inlet opening 382 of the stand pipe 380 whereas the dirt and water will fall through the baffle apertures 378 into the lowermost portion of the recovery tank 30.

A manifold chamber 384 is formed at the bottom of the stand pipe 380 and defined by the bottom member 308 and the foot member 24. Preferably, an elastomeric gasket 388 is mounted to the top of the manifold chamber 384 to create a substantially air-tight seal between the bottom of the stand pipe 380 and the manifold chamber 384. The manifold chamber 384 is shown integrally molded to the base member 24. Preferably however, the manifold chamber 384 is formed separately from the base member 24 and includes downwardly extending hooks (not shown) that engage with cantilevered arms (not shown) on the base member 24. The hooks are shaped to contact an upper surface of the arms and flex the arms downwardly when the manifold chamber 384 is installed. A locking surface (not shown) on the hooks then engages a lower surface of the arms to lock the manifold chamber 384 to the base member 24. A flexible conduit hose 386 extends from one end of the manifold to the impeller fan chamber mounted in the lower portion of the upper housing 16. In view of the fact that the upper housing 16 pivots with respect to the foot member 24 and recovery tank 30, the conduit 386 is preferably formed of a pliable, yet durable material.

A float 390 is provided inside the recovery tank 30 to prevent overfilling of the recovery tank 30 with fluid. The float 390 comprises a buoyant base 392 and a closure plate 394 interconnected to one another by a support plate 396. The closure plate 394 is dimensioned to fully seal the inlet opening 382 of the stand pipe 380 and prevent the flow of air or liquid therethrough.

The float 390 is limited primarily to vertical movement with respect to the recovery tank 30, with the closure plate positioned above the fluid containment baffle 370 and the buoyant base 392 positioned below the fluid containment baffle 370. The fluid containment baffle 370 also includes an aperture 398 through which the stand pipe 380 extends. In addition, a narrow slot 400 is also provided in the rear portion 374 of the fluid containment baffle 370 through which the support plate 396 of the float 390 extends. In the assembled position, the closure plate 394 is positioned above the fluid containment baffle 370 and the buoyant base 392 is positioned below the baffle 370.

Movement of the float is constrained because the buoyant base is captured in a float cage defined by the front wall 402 of the stand pipe 380, a pair of L-shaped walls 404, 406 (FIG. 10) extending up from the bottom member 308, a substantially planar wall 408 extending upwardly from the bottom member 308 intermediate the two L-shaped wall members 404, 406 and the rear portion 374 of the fluid containment baffle 370. Multiple slots 412 or fluid flow apertures are provided between the wall members 404, 406, 408 and the stand pipe 380 so that fluid will quickly and easily flow into the float cage defined by these elements. As the fluid within the tank and the float cage rises, the float 390 will also rise until eventually, the closure plate 394 nears the inlet opening 382 of the stand pipe 380. The closure plate 391 is sufficiently drawn against the stand pipe opening 394 by the suction from the vacuum motor 74 to close the air flow therethrough as illustrated by the phantom lines in FIG. 9. Once this happens, the pitch of the operating vacuum motor 74 is sufficient to warn the user that the recovery tank 30 is full and must be emptied.

The cover plate 336 has a triangular-shaped accessory hose flow aperture 422 and a lock aperture 428. A cover closure cap 420 has a spring arm 446 with a barb 448 which seats beneath the wall of the cover plate 336 at the lock aperture 428 when the cover cap 420 is seated over the aperture 428. A pair of retaining projections 423 extend rearwardly from a front edge of the aperture 422 into recesses 425 in a depending flange 421 of the cover cap 420 when the cover cap 420 is seated over the aperture 428. The cap 420 can thus pivot about the projections 423 as the cap is fastened over and removed from the aperture 422.

The recovery tank 30 is quickly and easily emptied by first tilting the handle 18 and upper housing 16 rearwardly. Then, the latches 32 are disengaged from the projections 34 on the recovery tank 30. The user grasps the handle 36 and merely lifts the tank 30 from the foot member 24 and transports it to an appropriate site for emptying the tank 30. The tank 30 can also be removed from the foot member 24 without tilting the handle 18 and upper housing 16. In any event the tank 30 can then be emptied by removing a cap 414 mounted to the drainage aperture 416 provided on the rear wall 368 of the tank 30. Once the tank 30 has been emptied, the cap 414 is replaced, the tank 30 is lowered down onto the foot member 24, and finally, the latches 32 are snapped over the projections 34 to lock the tank to the base assembly 14.

As seen in FIG. 2, the entirety of the accessory hose 52 is contained on the accessory hose storage rack 50 when the cleaning machine 12 is used for on-the-floor cleaning or when the machine is being stored. When it is desired to use the accessory hose 52, the user unsnaps the grip tube 64 from the C-shaped clip 66 of the hose rack 50 and unwinds the hose therefrom and then removes the accessory hose mounting member 62 from its corresponding C-shaped clip on the storage rack 50. Next, the user removes the cap 420 (FIG. 10) from the recovery tank cover plate 336, exposing the accessory hose flow aperture 422 and inserts the accessory hose mounting member 62 therein. The mounting member 62 comprises an elbow-shaped rigid conduit 424 which receives the flexible hose on one end thereof and a triangular shaped mounting plate 426 on the other end thereof.

Figure 11:
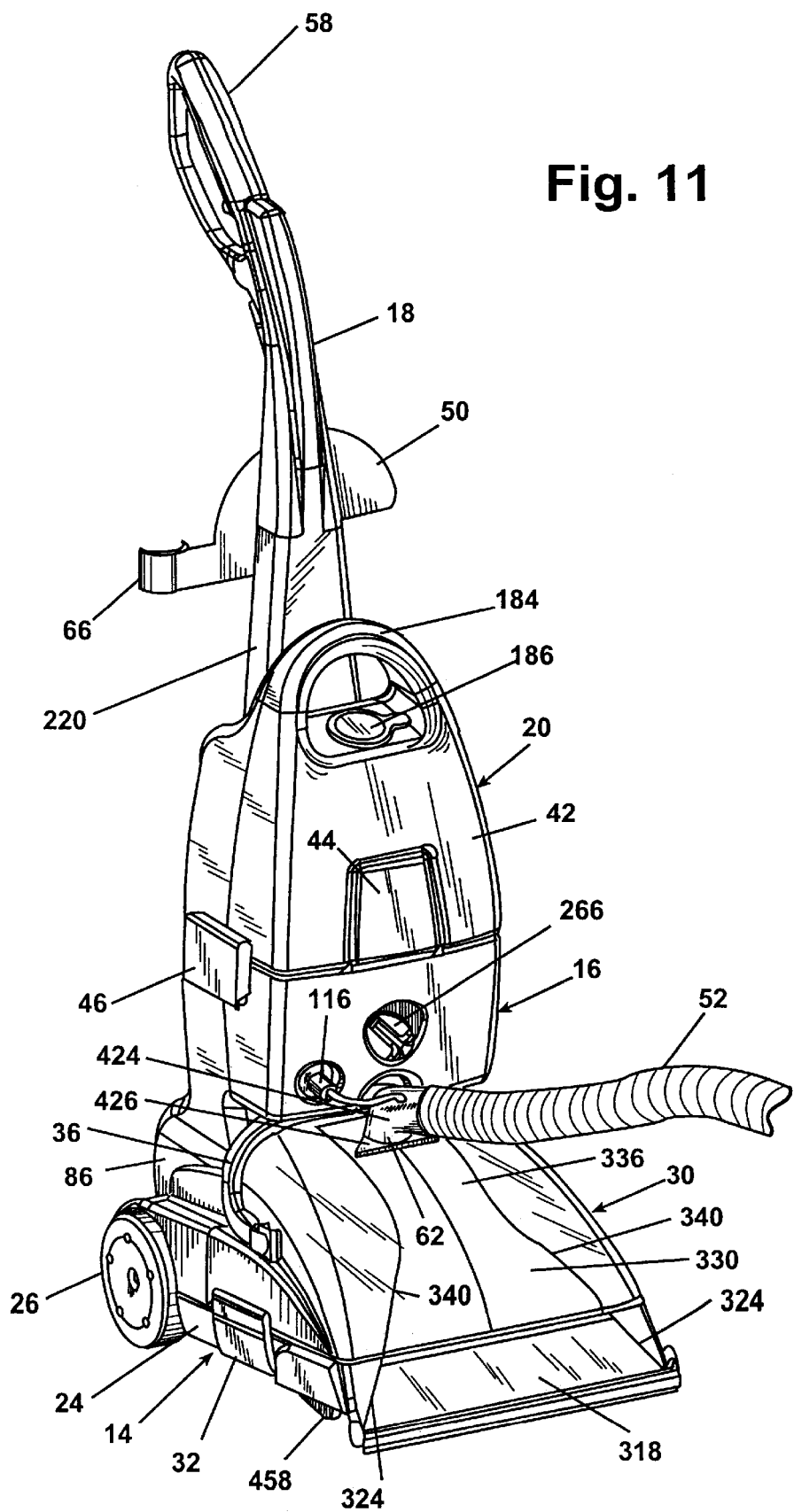
FIG. 11 is a front perspective view of the upright water extraction cleaning machine of FIG. 1 showing the accessory hose mounted in the operative position.
Figure 12:
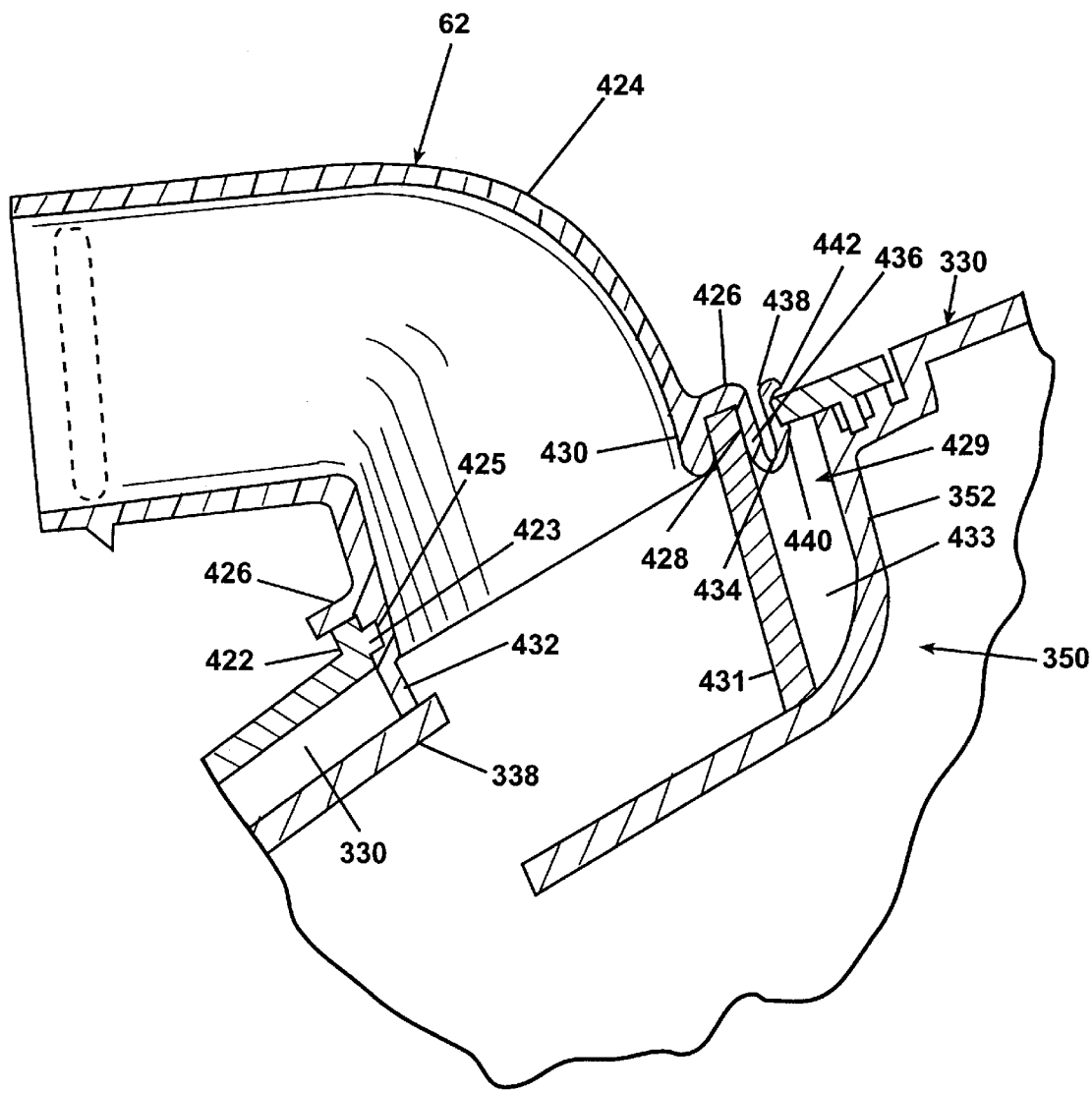
FIG. 12 is a partial, sectional view showing the mounting of the accessory hose to the recovery tank.

As seen in FIGS. 11 and 12, the accessory hose flow aperture 422 is preferably formed directly above the air/water separator baffle 350 when the cover plate 336 is mounted to the top member 310 of the recovery tank 30. The lock aperture 428 is also formed in the cover plate 336, directly adjacent the accessory hose flow aperture 422. The accessory hose mounting member 62 comprises a flange 430 which extends downwardly from the triangular support plate 426. The flange 430 is substantially complementary to the inside edge of the aperture 422 and is adapted to be snugly received therein. A baffle wall 432 extends downwardly along the front edge of the triangular flange 422 and has a recess 432a which receive the projections 423. The baffle 432 extends substantially the entire width of the intermediate working air conduit 330 and extends downwardly a sufficient distance to contact the bottom wall 338 of the conduit to thereby effectively seal the intermediate flow conduit 330 from the air/water separator baffle 350 and the vacuum motor 74. Therefore, substantially all of the working air drawn into the recovery tank 30 comes from the accessory hose 52 when the accessory hose 52 is mounted to the base as illustrated in FIG. 12.

The accessory hose mounting member 62 is retained in the aperture 422 by a U-shaped spring arm 434 which is received in the lock aperture 428 and a sealing pocket 429 located immediately below the aperture 428. The sealing pocket 429 is integrally formed with the rear wall 352 of the baffle 350 and includes a front wall 431 and a pair of sidewalls 433 extending between the front wall 431 and the baffle rear wall 352. The spring arm 434 comprises a pair of opposed legs 436, 438 connected to each other through a central bight portion 435. The leg 436 extends downwardly from the triangular-shaped support plate. A locking barb 440 is provided on the outside edge of the free leg 438 and a projection 442 is provided at the terminal end of the free leg 438. In use, the bight portion of the U-shaped arm 434 is initially inserted into the lock aperture 428. As the spring arm 434 is received in the aperture 428 and sealing pocket 429, the locking barb 440 bears against one edge of the aperture 428, thereby flexing the free leg 438 inwardly toward the other leg 436. Eventually, the locking barb 440 will drop below the inside edge of the cover plate 336 at the aperture 428 and the resilient U-shaped spring arm 434 will spring outwardly to seat the barb beneath the cover plate 336 edge. The edge of the cover plate 336 at the aperture 428 will be captured between the outer projection 442 and the locking barb 440 of the spring arm 434.

When the user desires to remove the accessory hose mounting member 62 from the aperture 422, the user squeezes the free leg 438 toward the inner leg 436 a sufficient distance to bring the locking projection 440 out of contact with the aperture edge. Then, the user lifts the mounting member 62 a sufficient distance to withdraw the spring arm 434, triangular-shaped flange 430 and baffle 432 from the aperture 422. Finally, the user repositions the cap 420 in the aperture 422 thereby effectively sealing the aperture 422.

As seen in FIGS. 9 and 10, the structure of the cap 420 is quite similar to the accessory hose mounting member 62 in that it includes an identical spring arm 446 and a substantially complimentary triangular flange extending downwardly therefrom. One key distinction is that the cap 420 does not include the downwardly extending baffle wall which seals the intermediate working air flow path 330.

Figure 13:
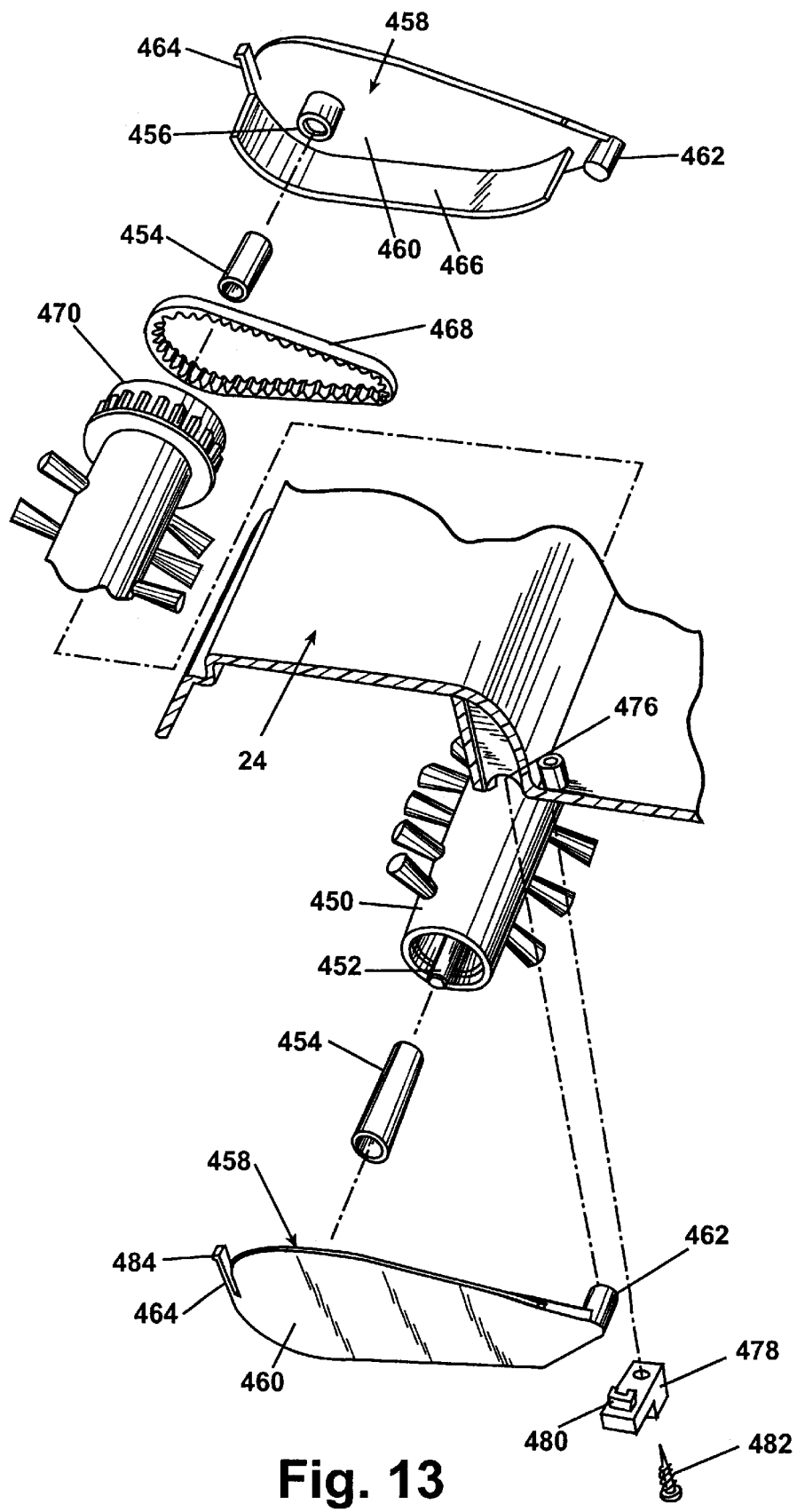
FIG. 13 is a partial, exploded view of the agitation brush assembly and foot member.

The preferred embodiment of the cleaning machine 12 includes a rotatably mounted agitation brush which is adapted for easy and instantaneous vertical adjustment. As seen in FIGS. 9 and 13, the agitation brush assembly comprises a brush dowel 450 fixedly mounted on a shaft 452. The ends of the shaft 452 are received in bearings 454 which in turn are press-fit into inwardly extending bosses 456 provided on a pair of opposed articulating arm members 458. Alternatively, stub shafts (not shown) can extend from the arm members 458 and the shaft 452 can be replaced with bearings similar to 454 for rotational installation of the dowel 450 on the arm members 458. Each arm member 458 comprises a back plate 460 with a pivot pin 462 provided at the rear of the plate 460 and a limit arm 464 provided at the front of the plate 460. In addition, a laterally extending belt guard 466 is preferably integrally formed with the articulating arm 458. The belt guard 466 extends laterally inwardly enough to cover the drive belt 468 in the assembled position. The belt guard 466 protects the belt 468 from threads and other foreign material becoming lodged therein and also protects the carpet or other surface positioned below the base assembly 14 from the rotating belt 468. The drive belt 468 extends around a pulley 470 mounted at one end of the brush dowel 450 and a drive shaft and pulley 472 of the brush motor 474.

The pivot pins 462 of the arm member 458 are captured between a bearing surface 476 integrally formed into the bottom of the foot member 24 and a retaining member 478 having a bearing surface 480 formed thereon. The pivot pin 462 is captured between the bearing surfaces 480, 476 of the retaining member 478 and the foot member 24. The retaining member 478 is secured to the foot member 24 by a conventional fastener, such as a screw 482.

The limit arms 464 provided at the front of the retaining members 478 are preferably integrally molded with the retaining members and are adapted to limit the downward movement of the brush assembly relative to the foot member 24. Each limit arm 464 has a forwardly extending barb 484 provided at the terminal end of the arm 464. In the operative position, the barb 484 is positioned above a rearwardly extending projection 486 provided on the foot member 24. As seen in FIG. 9, as the agitation brush assembly extends further and further downward, the barb 484 on the end of the limit arm 464 will contact the projection 486 and prevent any further downward movement. With this floating agitation brush assembly, the cleaning machine 12 according to the invention can almost instantaneously adapt to varying carpet naps or other inconsistencies on the surface being cleaned. The brush arms also allow the rotating brush to drop below the normal floor plane to provide contact with the floor when a bare floor cleaning attachment raises the suction nozzle opening height from the floor.

Figure 14:
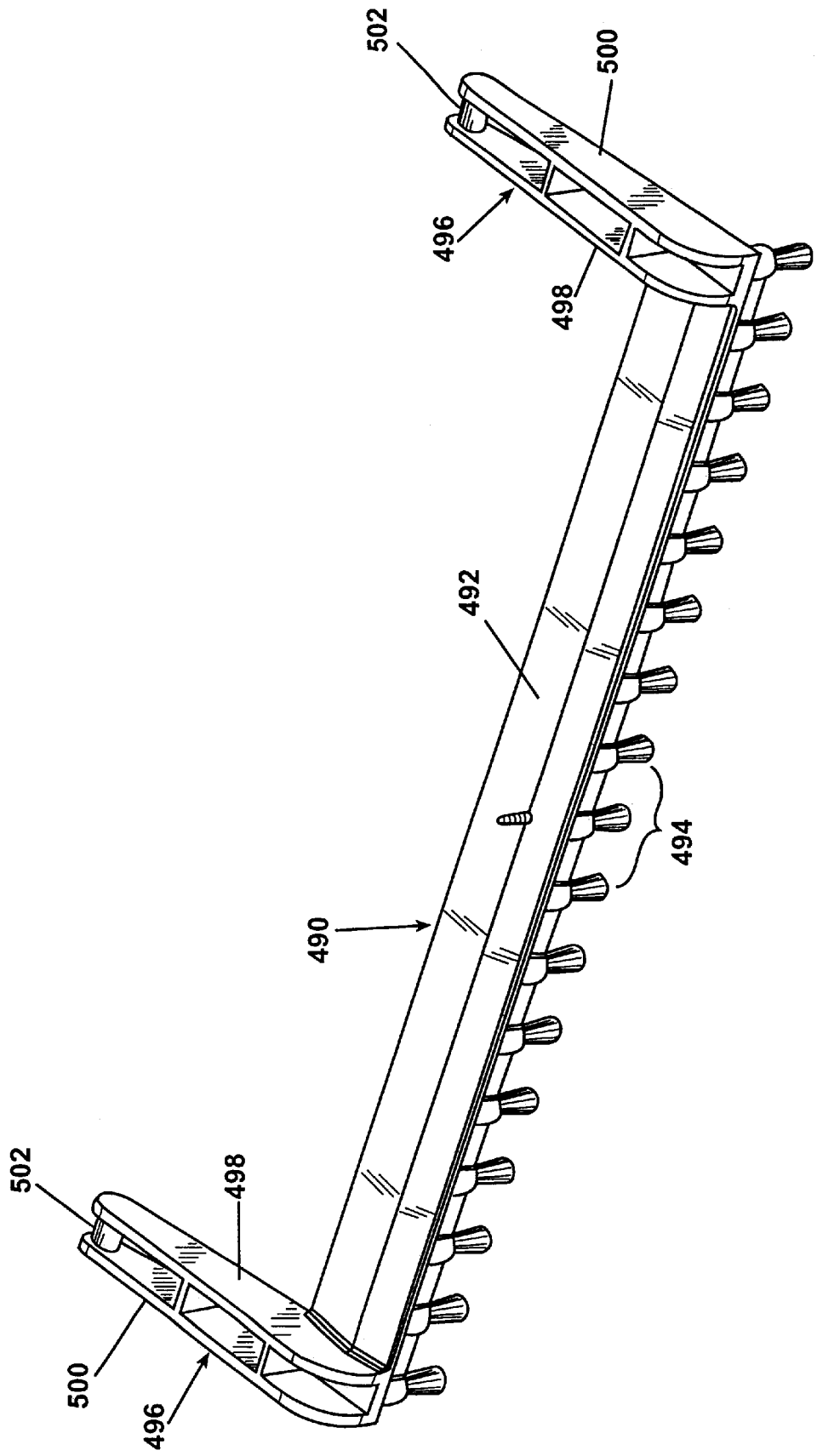
FIG. 14 is a perspective view of an alternative embodiment of the agitation brush of FIG. 13.

As an alternative to the floating, rotatably mounted agitation brush as seen in FIGS. 9 and 13, a floating strip agitation brush 490 could be incorporated in the cleaning machine 12, as seen in FIG. 14. The floating strip agitation brush 490 is easily adapted for incorporation into the cleaning machine 12. In this embodiment, the strip brush 490 comprises a linear brush body 492 with bristles 494 extending downwardly therefrom and a pair of integrally molded arm 496. Each of the arms 496 is formed by a pair of opposed plates 498, 500 and a pivot pin 502 extending between the rear most edge of the opposed plates 498, 500. The pivot pins 502 in this embodiment are secured to the foot member 24 in the same manner as the pivot pins 462 shown previously in FIG. 13. Namely, the pivot pins 502 are captured between the bearing surface 476 of the foot member 24 and the bearing surface 480 formed on the retention member 478 which is securely fastened to the foot member 24 by conventional fasteners 482. With this structure, the strip brush 490 can move vertically in response to changes in the carpet nap or other inconsistencies in the surface being cleaned.

As described above with respect to FIG. 1, the accessory hose solution tube mounting 116 is used primarily for connecting an accessory nozzle, such as found in the upholstery tool 68 in order to provide cleaning solution to the surface being cleaned. It is contemplated, however, that an elongate spray wand can be provided as an accessory attachment for the solution tube mounting 116. The detergent tank 44 could hold an insecticide solution that is mixed with water or other liquid from the clean water tank 42 in an adjustable ratio for the treatment of fleas or ticks, as an example. In use, the vacuum motor 74 and the brush motor 474 would be turned off, with the solution pump 112 turned on to deliver the insecticide solution to a surface. Alternatively, the clean water tank 42 could hold the insecticide solution or some other solution that is to be directly applied to a surface.

The water extraction cleaning machine according to the invention overcomes several of the problems of the prior art. Namely, the cleaning machine is easily adapted for a variety of cleaning operations. For example, the detergent to water mixture ratio can be altered nearly instantaneously. In addition, the height of the agitation brush with respect to the suction nozzle opening changes immediately in response to changes in the carpet nap and other inconsistencies in the surface being cleaned. The cleaning machine according the invention also provides easy and convenient means for filling and emptying the clean water and detergent tanks. Similarly, the recovery tank can be quickly and easily removed for emptying or cleaning. Finally, the accessory hose intended for use with the cleaning machine according to the invention is preferably stored on the machine at all times when not in use. This minimizes the storage space required for the machine and accessories and simultaneously ensures that the user has all attachments and accessories contained on the machine, regardless of where the machine is being used.

Reasonable variation and modification are possible within the spirit of the foregoing specification and drawings without departing from the scope of the invention.

The embodiments for which an exclusive property or privilege is claimed are defined as follows:

1. An improved upright water extraction cleaning machine comprising a base adapted for movement across a supporting surface, a handle pivotally mounted to the base, a fluid pump having a fluid inlet connected to at least one liquid holding tank and a fluid outlet connected to at least one spray nozzle to thereby transfer liquid from the at least one holding tank to the at least one spray nozzle under pressure and distribute the liquid onto the supporting surface, a suction nozzle mounted to the base to remove liquid and debris from the surface, and a vacuum source mounted to one of the base and the handle and connected to the suction nozzle to generate a working air flow for recovering the liquid and debris, the improvement comprising:

a priming valve having a valve body with an interior chamber, a valve inlet port connected to the pump and a valve outlet port connected to the vacuum source, a valve element located within the interior chamber and movable between a priming position wherein the valve element is spaced from the valve outlet port such that liquid can be drawn into the interior chamber of the hollow body when the vacuum source is operating, and a sealing position wherein the valve element seats against the valve outlet port to block liquid from entering the vacuum source.

2. An improved upright water extraction cleaning machine according to claim 1 wherein the weight and dimension of the valve element is chosen such that the presence of liquid, by itself, in the interior chamber is insufficient to move the valve element toward the valve outlet.

3. An improved upright water extraction cleaning machine according to claim 2 wherein the weight and dimension of the valve element is chosen such that the presence of negative pressure from the vacuum source acting on the valve element, by itself, is insufficient to move the valve element toward the valve outlet.

4. An improved upright water extraction cleaning machine according to claim 1 wherein the weight and dimension of the valve element is chosen such that the combined presence of negative air pressure on the valve element and movement of liquid in the interior chamber toward the valve outlet is sufficient to move the valve element toward the valve outlet.

5. An improved upright water extraction cleaning machine according to claim 1 wherein the pump and priming valve are both mounted on the handle with the priming valve being located higher than the pump.

6. An improved upright water extraction cleaning machine according to claim 1 wherein the priming valve is connected to the pump inlet.

7. An improved upright water extraction cleaning machine according to claim 1 wherein the priming valve is connected to the pump outlet.

8. An improved upright water extraction cleaning machine according to claim 1 wherein the valve element includes an umbrella valve.

9. An improved upright water extraction cleaning machine according to claim 1 wherein the valve element includes a conical plug.

10. An improved upright water extraction cleaning machine according to claim 1 wherein the valve element includes a spherical plug.

11. An improved upright water extraction cleaning machine according to claim 1 wherein the valve element includes a planar plug.

12. A portable surface cleaning apparatus, comprising:
a base module for movement along a surface;
an upright handle pivotally attached to the base module;
a fluid recovery system comprising:
  a tank on the base module having a fluid recovery chamber for holding recovered fluid;
  a suction nozzle associated with the base module;
  a working air conduit extending between the recovery chamber and the suction nozzle;
  a vacuum source in fluid communication with the recovery chamber for generating a flow of working air from the nozzle through the working air conduit and through the recovery chamber to thereby draw dirty liquid from the surface to be cleaned through the nozzle and working air conduit, and into the recovery chamber;
a liquid dispensing system comprising:
  a liquid dispensing nozzle associated with the base module for applying a cleaning fluid to a surface to be cleaned;
  a fluid supply chamber for holding a supply of cleaning fluid;
  a fluid supply conduit including a pump fluidly connected to the fluid supply chamber and to the dispensing nozzle for supplying cleaning fluid to the dispensing nozzle;
  a pump primer connected to the pump for priming the pump and including a valved opening connected to the vacuum source; the improvement comprising:
    the pump primer includes a housing defining a priming chamber with an inlet opening connected to the fluid supply chamber and an outlet opening connected to the pump.

13. A portable surface cleaning apparatus according to claim 12 wherein the valved opening is in an upper portion of the priming chamber.

14. A portable surface cleaning apparatus according to claim 13 wherein the pump primer further includes a valve chamber and a plunger chamber, the valve chamber has an inlet opening defined by the valved opening in the priming chamber and an outlet opening defining an inlet opening to the plunger chamber, the plunger chamber has an outlet opening in fluid communication with the vacuum source, and further comprising:
  a buoyant plunger reciprocally mounted in the plunger chamber for generally vertical movement therein;
  a valve mounted in the valve chamber and reciprocally moveable between the inlet opening and the outlet opening thereof and connected to the plunger for movement therewith;
  whereby the valve closes the outlet opening of the valve chamber when fluid in the plunger chamber raises the plunger, and the valve closes the inlet opening of the valve chamber when fluid in the plunger chamber falls to a predetermined level.

15. A portable surface cleaning apparatus according to claim 14 wherein the valve is an umbrella valve.

16. An improved upright water extraction cleaning machine according to claim 14 wherein the valve includes a conical plug.

17. An improved upright water extraction cleaning machine according to claim 14 wherein the valve includes a spherical plug.

18. An improved upright water extraction cleaning machine according to claim 14 wherein the valve includes a planar plug.

19. A portable surface cleaning apparatus according to claim 12 wherein the pump primer further includes a valve chamber and a plunger chamber, the valve chamber has an outlet opening defined by the valved opening and an inlet opening defining an outlet opening of the plunger chamber, and further comprising:
  a buoyant plunger reciprocally mounted in the plunger chamber for generally vertical movement therein;
  a valve mounted in the valve chamber and reciprocally moveable between the inlet opening and the outlet opening thereof and connected to the plunger for movement therewith;
  whereby the valve closes the outlet opening of the valve chamber when fluid in the plunger chamber raises the plunger, and the valve closes the inlet opening of the valve chamber when fluid in the plunger chamber falls to a predetermined level.

20. A portable surface cleaning apparatus according to claim 19 wherein the valve is an umbrella valve.

21. An improved upright water extraction cleaning machine according to claim 19 wherein the valve includes a conical plug.

22. An improved upright water extraction cleaning machine according to claim 19 wherein the valve includes a spherical plug.

23. An improved upright water extraction cleaning machine according to claim 19 wherein the valve includes a planar plug.

24. An improved upright water extraction cleaning machine according to claim 12 wherein the pump primer is connected to the pump inlet.

25. An improved upright water extraction cleaning machine according to claim 12 wherein the pump primer is connected to the pump outlet.

26. An improved upright water extraction cleaning machine according to claim 12 wherein the pump primer further includes a buoyant plunger and an umbrella valve.

27. An improved upright water extraction cleaning machine according to claim 12 wherein the pump primer further includes a buoyant plunger and a conical plug.

28. An improved upright water extraction cleaning machine according to claim 12 wherein the pump primer further includes a buoyant plunger and a spherical plug.

29. An improved upright water extraction cleaning machine according to claim 12 wherein the pump primer further includes a buoyant plunger and a planar plug.

30. An improved upright water extraction cleaning machine according to claim 12 wherein the pump primer further includes an umbrella valve.

31. An improved upright water extraction cleaning machine according to claim 12 wherein the pump primer further includes a conical plug.

32. An improved upright water extraction cleaning machine according to claim 12 wherein the pump primer further includes a spherical plug.

33. An improved upright water extraction cleaning machine according to claim 12 wherein the pump primer further includes a planar plug.

* * * * *